(12) United States Patent
Usadi et al.

(10) Patent No.: US 9,058,445 B2
(45) Date of Patent: Jun. 16, 2015

(54) METHOD AND SYSTEM FOR RESERVOIR MODELING

(75) Inventors: Adam Usadi, Basking Ridge, NJ (US); Dachang Li, Katy, TX (US); Rossen Parashkevov, Houston, TX (US); Xiaohui Wu, Sugar Land, TX (US); Yahan Yang, Pearland, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 153 days.

(21) Appl. No.: 13/805,651

(22) PCT Filed: May 23, 2011

(86) PCT No.: PCT/US2011/037594
§ 371 (c)(1),
(2), (4) Date: Dec. 19, 2012

(87) PCT Pub. No.: WO2012/015521
PCT Pub. Date: Feb. 2, 2012

(65) Prior Publication Data
US 2013/0166264 A1    Jun. 27, 2013

Related U.S. Application Data

(60) Provisional application No. 61/368,940, filed on Jul. 29, 2010.

(51) Int. Cl.
*G06F 17/10*    (2006.01)
*G06G 7/48*    (2006.01)
(Continued)

(52) U.S. Cl.
CPC ........ *G06F 17/5009* (2013.01); *G06F 2217/16* (2013.01)

(58) Field of Classification Search
CPC . G06F 17/5009; G06F 2217/16; G01V 11/00; G01V 2210/1234; E21B 43/00; E21B 43/164; E21B 43/166; E21B 43/168; E21B 43/40; E21B 49/00
USPC ................................... 703/2, 9, 10; 166/266
See application file for complete search history.

(56) References Cited

U.S. PATENT DOCUMENTS 5,537,320 A    7/1996    Simpson et al.
5,671,136 A    9/1997    Willhoit, Jr.
(Continued)

FOREIGN PATENT DOCUMENTS

WO    99/28767    6/1999
WO    2007/022289    2/2007
(Continued)

OTHER PUBLICATIONS

Aarnes, J. (2004), "Multiscale simulation of flow in heterogeneous oil-reservoirs", SINTEF ICT, Dept. of Applied Mathematics, 2 pgs.
(Continued)

*Primary Examiner* — Kamini S Shah
*Assistant Examiner* — Andre Pierre Louis
(74) *Attorney, Agent, or Firm* — ExxonMobil Upstream Research Company Law Dept.

(57) ABSTRACT

A method is presented for modeling reservoir properties. The method includes constructing a coarse computational mesh for the reservoir. The coarse computational mesh comprises a plurality of cells. The method further includes determining a plurality of flows for each of the plurality of cells based on Dirichlet boundary conditions. Additionally, the method includes determining a solution to a coarse pressure equation for the reservoir based on the plurality of flows.

16 Claims, 12 Drawing Sheets

(51) Int. Cl.
*G06G 7/50* (2006.01)
*G06F 17/50* (2006.01)

(56) References Cited

U.S. PATENT DOCUMENTS

| | | | |
|---|---|---|---|
| 5,706,194 A | 1/1998 | Neff et al. | |
| 5,710,726 A | 1/1998 | Rowney et al. | |
| 5,747,673 A | 5/1998 | Ungerer et al. | |
| 5,838,634 A | 11/1998 | Jones et al. | |
| 5,844,799 A | 12/1998 | Joseph et al. | |
| 5,953,680 A | 9/1999 | Divies et al. | |
| 5,992,519 A | 11/1999 | Ramakrishnan et al. | |
| 6,018,498 A | 1/2000 | Neff et al. | |
| 6,052,520 A | 4/2000 | Watts, III | |
| 6,078,869 A * | 6/2000 | Gunasekera | 702/6 |
| 6,106,561 A | 8/2000 | Farmer | |
| 6,128,577 A | 10/2000 | Assa et al. | |
| 6,128,579 A | 10/2000 | McCormack et al. | |
| 6,138,076 A | 10/2000 | Graf et al. | |
| 6,230,101 B1 | 5/2001 | Wallis | |
| 6,374,185 B1 | 4/2002 | Taner et al. | |
| 6,480,790 B1 | 11/2002 | Calvert et al. | |
| 6,549,854 B1 | 4/2003 | Malinverno et al. | |
| 6,597,995 B1 | 7/2003 | Cornu et al. | |
| 6,662,146 B1 | 12/2003 | Watts | |
| 6,664,961 B2 | 12/2003 | Ray et al. | |
| 6,823,296 B2 | 11/2004 | Rey-Fabret et al. | |
| 6,823,297 B2 | 11/2004 | Jenny et al. | |
| 6,826,483 B1 | 11/2004 | Anderson et al. | |
| 6,826,520 B1 | 11/2004 | Khan et al. | |
| 6,826,521 B1 | 11/2004 | Hess et al. | |
| 6,839,632 B2 | 1/2005 | Grace | |
| 6,901,391 B2 | 5/2005 | Storm, Jr. et al. | |
| 6,940,507 B2 | 9/2005 | Repin et al. | |
| 6,980,940 B1 | 12/2005 | Gurpinar et al. | |
| 6,987,878 B2 | 1/2006 | Lees et al. | |
| 7,043,367 B2 | 5/2006 | Granjeon | |
| 7,069,149 B2 | 6/2006 | Goff et al. | |
| 7,089,166 B2 | 8/2006 | Malthe-Sorenssen et al. | |
| 7,096,122 B2 | 8/2006 | Han | |
| 7,096,172 B2 | 8/2006 | Colvin et al. | |
| 7,177,787 B2 | 2/2007 | Rey-Fabret et al. | |
| 7,191,071 B2 | 3/2007 | Kfoury et al. | |
| 7,254,091 B1 | 8/2007 | Gunning et al. | |
| 7,277,796 B2 | 10/2007 | Kuchuk et al. | |
| 7,280,952 B2 | 10/2007 | Butler et al. | |
| 7,286,972 B2 | 10/2007 | Maker | |
| 7,363,163 B2 | 4/2008 | Valec-Dupin et al. | |
| 7,369,980 B2 | 5/2008 | Deffenbaugh et al. | |
| 7,376,539 B2 | 5/2008 | Lecomte | |
| 7,379,853 B2 | 5/2008 | Middya | |
| 7,379,854 B2 | 5/2008 | Calvert et al. | |
| 7,406,878 B2 | 8/2008 | Rieder et al. | |
| 7,412,363 B2 | 8/2008 | Callegari | |
| 7,415,401 B2 | 8/2008 | Calvert et al. | |
| 7,424,415 B2 | 9/2008 | Vassilev | |
| 7,433,786 B2 | 10/2008 | Adams | |
| 7,451,066 B2 | 11/2008 | Edwards et al. | |
| 7,467,044 B2 | 12/2008 | Tran et al. | |
| 7,478,024 B2 | 1/2009 | Gurpinar et al. | |
| 7,480,205 B2 | 1/2009 | Wei | |
| 7,486,589 B2 | 2/2009 | Lee et al. | |
| 7,516,056 B2 | 4/2009 | Wallis et al. | |
| 7,523,024 B2 | 4/2009 | Endres et al. | |
| 7,526,418 B2 | 4/2009 | Pita et al. | |
| 7,539,625 B2 | 5/2009 | Klumpen et al. | |
| 7,542,037 B2 | 6/2009 | Fremming | |
| 7,546,229 B2 | 6/2009 | Jenny et al. | |
| 7,548,840 B2 | 6/2009 | Saaf | |
| 7,577,527 B2 | 8/2009 | Velasquez | |
| 7,584,081 B2 | 9/2009 | Wen et al. | |
| 7,596,056 B2 | 9/2009 | Keskes et al. | |
| 7,596,480 B2 | 9/2009 | Fung et al. | |
| 7,603,265 B2 | 10/2009 | Mainguy et al. | |
| 7,606,691 B2 | 10/2009 | Calvert et al. | |
| 7,617,082 B2 | 11/2009 | Childs et al. | |
| 7,620,800 B2 | 11/2009 | Huppenthal et al. | |
| 7,640,149 B2 | 12/2009 | Rowan et al. | |
| 7,657,494 B2 | 2/2010 | Wilkinson et al. | |
| 7,672,825 B2 | 3/2010 | Brouwer et al. | |
| 7,684,929 B2 | 3/2010 | Prange et al. | |
| 7,706,981 B2 | 4/2010 | Wilkinson et al. | |
| 7,711,532 B2 | 5/2010 | Dulac et al. | |
| 7,716,029 B2 | 5/2010 | Couet et al. | |
| 7,739,089 B2 | 6/2010 | Gurpinar et al. | |
| 7,752,023 B2 | 7/2010 | Middya | |
| 7,756,694 B2 | 7/2010 | Graf et al. | |
| 7,783,462 B2 | 8/2010 | Landis, Jr. et al. | |
| 7,796,469 B2 | 9/2010 | Keskes et al. | |
| 7,809,537 B2 | 10/2010 | Hemanthkumar et al. | |
| 7,809,538 B2 | 10/2010 | Thomas | |
| 7,822,554 B2 | 10/2010 | Zuo et al. | |
| 7,844,430 B2 | 11/2010 | Landis, Jr. et al. | |
| 7,860,654 B2 | 12/2010 | Stone | |
| 7,869,954 B2 | 1/2011 | Den Boer et al. | |
| 7,877,246 B2 | 1/2011 | Moncorge et al. | |
| 7,878,268 B2 | 2/2011 | Chapman et al. | |
| 7,920,970 B2 | 4/2011 | Zuo et al. | |
| 7,925,481 B2 | 4/2011 | Van Wagoner et al. | |
| 7,932,904 B2 | 4/2011 | Branets et al. | |
| 7,933,750 B2 | 4/2011 | Morton et al. | |
| 7,953,585 B2 | 5/2011 | Gurpinar et al. | |
| 7,970,593 B2 | 6/2011 | Roggero et al. | |
| 7,986,319 B2 | 7/2011 | Dommisse et al. | |
| 7,991,600 B2 | 8/2011 | Callegari | |
| 7,996,154 B2 | 8/2011 | Zuo et al. | |
| 8,005,658 B2 | 8/2011 | Tilke et al. | |
| 8,050,892 B2 | 11/2011 | Hartman | |
| 8,078,437 B2 | 12/2011 | Wu et al. | |
| 8,095,345 B2 | 1/2012 | Hoversten | |
| 8,095,349 B2 | 1/2012 | Kelkar et al. | |
| 8,145,464 B2 | 3/2012 | Arengaard et al. | |
| 8,190,405 B2 | 5/2012 | Appleyard | |
| 8,204,726 B2 | 6/2012 | Lee et al. | |
| 8,204,727 B2 | 6/2012 | Dean et al. | |
| 8,209,202 B2 | 6/2012 | Narayanan et al. | |
| 8,212,814 B2 | 7/2012 | Branets et al. | |
| 8,249,842 B2 | 8/2012 | Ghorayeb et al. | |
| 8,255,195 B2 | 8/2012 | Yogeswaren | |
| 8,271,248 B2 | 9/2012 | Pomerantz et al. | |
| 8,275,589 B2 | 9/2012 | Montaron et al. | |
| 8,275,593 B2 | 9/2012 | Zhao | |
| 8,280,635 B2 | 10/2012 | Ella et al. | |
| 8,280,709 B2 | 10/2012 | Koutsabeloulis et al. | |
| 8,285,532 B2 | 10/2012 | Zangl et al. | |
| 8,301,426 B2 | 10/2012 | Abasov et al. | |
| 8,301,429 B2 | 10/2012 | Hajibeygi et al. | |
| 8,315,845 B2 | 11/2012 | Lepage | |
| 8,335,677 B2 | 12/2012 | Yeten et al. | |
| 8,339,396 B2 | 12/2012 | Williams et al. | |
| 8,350,851 B2 | 1/2013 | Flew et al. | |
| 8,359,184 B2 | 1/2013 | Massonnat | |
| 8,359,185 B2 | 1/2013 | Pita et al. | |
| 8,374,974 B2 | 2/2013 | Chen et al. | |
| 8,386,227 B2 | 2/2013 | Fung et al. | |
| 8,401,832 B2 | 3/2013 | Ghorayeb et al. | |
| 8,412,501 B2 | 4/2013 | Oury et al. | |
| 8,412,502 B2 | 4/2013 | Moncorge et al. | |
| 8,423,338 B2 | 4/2013 | Ding et al. | |
| 8,428,919 B2 | 4/2013 | Parashkevov | |
| 8,429,671 B2 | 4/2013 | Wood et al. | |
| 8,433,551 B2 | 4/2013 | Fung et al. | |
| 8,437,999 B2 | 5/2013 | Pita et al. | |
| 8,447,525 B2 | 5/2013 | Pepper et al. | |
| 8,452,580 B2 | 5/2013 | Strebelle | |
| 8,457,940 B2 | 6/2013 | Xi et al. | |
| 8,463,586 B2 | 6/2013 | Mezghani et al. | |
| 8,484,004 B2 | 7/2013 | Schottle et al. | |
| 8,489,375 B2 | 7/2013 | Omeragic et al. | |
| 8,494,828 B2 | 7/2013 | Wu et al. | |
| 8,498,852 B2 | 7/2013 | Xu et al. | |
| 8,504,341 B2 | 8/2013 | Cullick et al. | |
| 8,510,242 B2 | 8/2013 | Al-Fattah | |
| 8,515,678 B2 | 8/2013 | Pepper et al. | |

(56) References Cited

U.S. PATENT DOCUMENTS

| | | | |
|---|---|---|---|
| 8,515,720 B2 | 8/2013 | Koutsabeloulis et al. |
| 8,515,721 B2 | 8/2013 | Morton et al. |
| 8,521,496 B2 | 8/2013 | Schottle et al. |
| 8,532,967 B2 | 9/2013 | Torrens et al. |
| 8,532,969 B2 | 9/2013 | Li et al. |
| 8,543,364 B2 | 9/2013 | Liu et al. |
| 8,577,660 B2 | 11/2013 | Wendt et al. |
| 8,583,411 B2 | 11/2013 | Fung |
| 8,589,135 B2 | 11/2013 | Middya et al. |
| 8,599,643 B2 | 12/2013 | Pepper et al. |
| 8,606,524 B2 | 12/2013 | Soliman et al. |
| 8,612,194 B2 | 12/2013 | Horne et al. |
| 8,630,831 B2 | 1/2014 | Bratvedt et al. |
| 8,635,026 B2 | 1/2014 | Ameen |
| 8,639,444 B2 | 1/2014 | Pepper et al. |
| 8,655,632 B2 | 2/2014 | Moguchaya |
| 8,674,984 B2 | 3/2014 | Ran et al. |
| 8,676,557 B2 | 3/2014 | Ding et al. |
| 8,686,996 B2 | 4/2014 | Cheung et al. |
| 8,688,424 B2 | 4/2014 | Bourbiaux et al. |
| 8,694,261 B1 | 4/2014 | Robinson |
| 8,700,549 B2 | 4/2014 | Hossain et al. |
| 8,712,746 B2 | 4/2014 | Tillier et al. |
| 8,712,747 B2 | 4/2014 | Cullick et al. |
| 8,718,958 B2 | 5/2014 | Breton et al. |
| 8,718,993 B2 | 5/2014 | Klie |
| 8,731,887 B2 | 5/2014 | Hilliard et al. |
| 8,731,891 B2 | 5/2014 | Sung et al. |
| 8,738,294 B2 | 5/2014 | Ameen |
| 8,762,442 B2 | 6/2014 | Jeong et al. |
| 8,775,141 B2 | 7/2014 | Raphael |
| 8,775,144 B2 | 7/2014 | Han et al. |
| 8,776,895 B2 | 7/2014 | Li et al. |
| 8,780,671 B2 | 7/2014 | Sayers |
| 8,793,111 B2 | 7/2014 | Tilke et al. |
| 8,797,319 B2 | 8/2014 | Lin |
| 8,798,974 B1 | 8/2014 | Nunns |
| 8,798,977 B2 | 8/2014 | Hajibeygi et al. |
| 8,803,878 B2 | 8/2014 | Andersen et al. |
| 8,805,660 B2 | 8/2014 | Güyagüler et al. |
| 8,812,334 B2 | 8/2014 | Givens et al. |
| 8,818,778 B2 | 8/2014 | Salazar-Tio et al. |
| 8,818,780 B2 | 8/2014 | Calvert et al. |
| 8,843,353 B2 | 9/2014 | Posamentier et al. |
| 8,855,986 B2 | 10/2014 | Castellini et al. |
| 8,862,450 B2 | 10/2014 | Derfoul et al. |
| 8,874,804 B2 | 10/2014 | AlShaikh et al. |
| 8,898,017 B2 | 11/2014 | Kragas et al. |
| 8,903,694 B2 | 12/2014 | Wallis et al. |
| 8,935,141 B2 | 1/2015 | Ran et al. |
| 2002/0049575 A1 | 4/2002 | Jalali et al. |
| 2005/0171700 A1 | 8/2005 | Dean |
| 2006/0122780 A1 | 6/2006 | Cohen et al. |
| 2006/0269139 A1 | 11/2006 | Keskes et al. |
| 2007/0016389 A1 | 1/2007 | Ozgen |
| 2007/0277115 A1 | 11/2007 | Glinsky et al. |
| 2007/0279429 A1 | 12/2007 | Ganzer et al. |
| 2008/0126168 A1 | 5/2008 | Carney et al. |
| 2008/0133550 A1 | 6/2008 | Orangi et al. |
| 2008/0144903 A1 | 6/2008 | Wang et al. |
| 2008/0234988 A1 | 9/2008 | Chen et al. |
| 2008/0306803 A1 | 12/2008 | Vaal et al. |
| 2009/0071239 A1 | 3/2009 | Rojas et al. |
| 2009/0122061 A1 | 5/2009 | Hammon, III |
| 2009/0248373 A1 | 10/2009 | Druskin et al. |
| 2010/0004908 A1* | 1/2010 | Lunati ............................ 703/2 |
| 2010/0132450 A1 | 6/2010 | Pomerantz et al. |
| 2010/0138196 A1 | 6/2010 | Hui et al. |
| 2010/0161300 A1 | 6/2010 | Yeten et al. |
| 2010/0179797 A1 | 7/2010 | Cullick et al. |
| 2010/0185428 A1 | 7/2010 | Vink |
| 2010/0191516 A1 | 7/2010 | Benish et al. |
| 2010/0312535 A1 | 12/2010 | Chen et al. |
| 2010/0324873 A1 | 12/2010 | Cameron |
| 2011/0004447 A1 | 1/2011 | Hurley et al. |
| 2011/0015910 A1 | 1/2011 | Ran et al. |
| 2011/0054869 A1 | 3/2011 | Li et al. |
| 2011/0115787 A1 | 5/2011 | Kadlec |
| 2011/0161133 A1 | 6/2011 | Staveley et al. |
| 2011/0310101 A1 | 12/2011 | Prange et al. |
| 2012/0059640 A1 | 3/2012 | Roy et al. |
| 2012/0065951 A1 | 3/2012 | Roy et al. |
| 2012/0143577 A1 | 6/2012 | Szyndel et al. |
| 2012/0158389 A1 | 6/2012 | Wu et al. |
| 2012/0159124 A1 | 6/2012 | Hu et al. |
| 2012/0215512 A1 | 8/2012 | Sarma |
| 2012/0215513 A1 | 8/2012 | Branets et al. |
| 2012/0232799 A1 | 9/2012 | Zuo et al. |
| 2012/0232859 A1 | 9/2012 | Pomerantz et al. |
| 2012/0232861 A1 | 9/2012 | Lu et al. |
| 2012/0232865 A1 | 9/2012 | Maucec et al. |
| 2012/0265512 A1 | 10/2012 | Hu et al. |
| 2012/0271609 A1 | 10/2012 | Laake et al. |
| 2012/0296617 A1 | 11/2012 | Zuo et al. |
| 2013/0035913 A1 | 2/2013 | Mishev et al. |
| 2013/0041633 A1 | 2/2013 | Hoteit |
| 2013/0046524 A1 | 2/2013 | Gathogo et al. |
| 2013/0073268 A1 | 3/2013 | Abacioglu et al. |
| 2013/0085730 A1 | 4/2013 | Shaw et al. |
| 2013/0090907 A1 | 4/2013 | Maliassov |
| 2013/0096890 A1 | 4/2013 | Vanderheyden et al. |
| 2013/0096898 A1 | 4/2013 | Usadi et al. |
| 2013/0096899 A1 | 4/2013 | Usadi et al. |
| 2013/0096900 A1 | 4/2013 | Usadi et al. |
| 2013/0110484 A1 | 5/2013 | Hu et al. |
| 2013/0112406 A1 | 5/2013 | Zuo et al. |
| 2013/0116993 A1 | 5/2013 | Maliassov |
| 2013/0118736 A1 | 5/2013 | Usadi et al. |
| 2013/0124097 A1 | 5/2013 | Thorne |
| 2013/0124173 A1 | 5/2013 | Lu et al. |
| 2013/0138412 A1 | 5/2013 | Shi et al. |
| 2013/0151159 A1 | 6/2013 | Pomerantz et al. |
| 2013/0166264 A1 | 6/2013 | Usadi et al. |
| 2013/0185033 A1 | 7/2013 | Tompkins et al. |
| 2013/0204922 A1 | 8/2013 | El-Bakry et al. |
| 2013/0231907 A1 | 9/2013 | Yang et al. |
| 2013/0231910 A1 | 9/2013 | Kumar et al. |
| 2013/0245949 A1 | 9/2013 | Abitrabi et al. |
| 2013/0246031 A1 | 9/2013 | Wu et al. |
| 2013/0289961 A1 | 10/2013 | Ray et al. |
| 2013/0304679 A1 | 11/2013 | Fleming et al. |
| 2013/0311151 A1 | 11/2013 | Plessix |
| 2013/0312481 A1 | 11/2013 | Pelletier et al. |
| 2013/0332125 A1 | 12/2013 | Suter et al. |
| 2013/0338985 A1 | 12/2013 | Garcia et al. |
| 2014/0012557 A1 | 1/2014 | Tarman et al. |
| 2014/0201450 A1 | 7/2014 | Haugen |
| 2014/0236558 A1 | 8/2014 | Maliassov |

FOREIGN PATENT DOCUMENTS

| | | |
|---|---|---|
| WO | 2007/116008 | 10/2007 |
| WO | WO 2008/008121 | 1/2008 |
| WO | 2009/138290 | 11/2009 |
| WO | 2013/180709 | 12/2013 |
| WO | 2014/051903 | 4/2014 |

OTHER PUBLICATIONS

Farmer, C.L. (2002), "Upscaling: a review", *Int'l. Journal for Numerical Methods in Fluids* 40, pp. 63-78.

U.S. Appl. No. 14/461,193, filed Aug. 15, 2014, Casey.

U.S. Appl. No. 62/081,159, filed Nov. 18, 2014, Branets et al.

U.S. Appl. No. 62/073,465, filed Oct. 31, 2014, Bi, et al.

U.S. Appl. No. 62/033,529, filed Aug. 5, 2014, Casey.

U.S. Appl. No. 62/031,097, filed Jul. 30, 2014, Branets, et al.

Aarnes, J. et al. (2004), "Toward reservoir simulation on geological grid models", 9th European Conf. on the Mathematics of Oil Recovery, 8 pgs.

Ahmadizadeh, M., et al., (2007), "Combined Implicit or Explicit Integration Steps for Hybrid Simulation", *Structural Engineering Research Frontiers*, pp. 1-16.

(56) References Cited

OTHER PUBLICATIONS

Bortoli, L. J., et al., (1992), "Constraining Stochastic Images to Seismic Data", Geostatistics, Troia, *Quantitative Geology and Geostatistics* 1, 325-338.

Byer, T.J., et al., (1998), "Preconditioned Newton Methods for Fully Coupled Reservoir and Surface Facility Models", *SPE 49001, 1998 SPE Annual Tech. Conf, and Exh.*, pp. 181-188.

Candes, E. J., et al., (2004), "New Tight Frames of Curvelets and Optimal Representations of Objects with $C^2$ Singularities," *Communications on Pure and Applied Mathematics* 57, 219-266.

Chen, Y. et al. (2003), "A coupled local-global upscaling approach for simulating flow in highly heterogeneous formations", *Advances in Water Resources* 26, pp. 1041-1060.

Connolly, P., (1999), "Elastic Impedance," *The Leading Edge* 18, 438-452.

Crotti, M.A. (2003), "Upscaling of Relative Permeability Curves for Reservoir Simulation: An Extension to Areal Simulations Based on Realistic Average Water Saturations", SPE 81038, SPE Latin American and Caribbean Petroleum Engineering Conf., 6 pgs.

Donoho, D. L., Hou, X., (2002), "Beamlets and Multiscale Image Analysis," *Multiscale and Multiresolution Methods, Lecture Notes in Computational Science and Engineering* 20, 149-196.

Durlofsky, L.J. (1991), "Numerical Calculation of Equivalent Grid Block Permeability Tensors for Heterogeneous Porous Media", *Water Resources Research* 27(5), pp. 699-708.

Farmer, C.L. (2002), "Upscaling: a review", *Int 'l. Journal for Numerical Methods in Fluids* 40, pp. 63-78.

Gai, X., et al., (2005), "A Timestepping Scheme for Coupled Reservoir Flow and Geomechanics in Nonmatching Grids", *SPE 97054, 2005 SPE Annual Tech. Conf and Exh.*, pp. 1-11.

Haas, A., et al., (1994), "Geostatistical Inversion—A Sequential Method of Stochastic Reservoir Modeling Constrained by Seismic Data," *First Break* 12, 561-569 (1994).

Holden, L. et al. (1992), "A Tensor Estimator for the Homogenization of Absolute Permeability", *Transport in Porous Media* 8, pp. 37-46.

Isaaks, E. H., et al., (1989), "Applied Geostatistics", *Oxford University Press*, New York, pp. 40-65.

Journel, A., (1992), "Geostatistics: Roadblocks and Challenges," *Geostatistics, Troia '92: Quanititative Geoglogy and Geostatistics* 1, 213-224.

Klie, H., et al., (2005), "Krylov-Secant Methods for Accelerating The Solution of Fully Implicit Formulations", *SPE 92863, 2005 SPE Reservoir Simulation Symposium*, 9 pgs.

Mallat, S., (1999), "A Wavelet Tour of Signal Processing", *Academic Press*, San Diego, pp. 80-91.

Lu, B., et al., (2007), "Iteratively Coupled Reservoir Simulation for Multiphase Flow", *SPE 110114, 2007 SPE Annual Tech. Conf and Exh.*, pp. 1-9.

Mosqueda, G., et al., (2007), "Combined Implicit or Explicit Integration Steps for Hybrid Simulation", *Earthquake Engng. & Struct. Dyn.*, vol. 36(15), pp. 2325-2343.

Strebelle, S., (2002), "Conditional simulations of complex geological structures using multiple-point statistics," *Mathematical Geology* 34(1), 1-21.

Sweldens, W., (1998), "The Lifting Scheme: A Construction of Second Generation Wavelets," *SIAM Journal on Mathematical Analysis* 29, 511-546.

Qi, D. et al. (2001), "An Improved Global Upscaling Approach for Reservoir Simulation", *Petroleum Science and Technology* 19(7&8), pp. 779-795.

Verly, G., (1991), "Sequential Gaussian Simulation: A Monte Carlo Approach for Generating Models of Porosity and Permeability," Special Publication No. 3 of EAPG—Florence 1991 Conference, Ed.: Spencer, A.M.

Whitcombe, D. N., et al., (2002), "Extended elastic impedance for fluid and lithology prediction," *Geophysics* 67, 63-67.

White, C.D. et al. (1987), "Computing Absolute Transmissibility in the Presence of Fine-Scale Heterogeneity", SPE 16011, $9^{th}$ SPE Symposium in Reservoir Simulation, pp. 209-220.

Wu, X.H. et al. (2007), "Reservoir Modeling with Global Scaleup", SPE 105237, $15^{th}$ SPE Middle East Oil & Gas Show & Conf., 13 pgs.

Yao, T., et al., (2004), "Spectral Component Geologic Modeling: A New Technology for Integrating Seismic Information at the Correct Scale," Geostatistics Banff, *Quantitative Geology & Geostatistics* 14, pp. 23-33.

Younis, R.M., et al., (2009), "Adaptively-Localized-Continuation-Newton: Reservoir Simulation Nonlinear Solvers That Converge All the Time", *SPE 119147, 2009 SPE Reservoir Simulation Symposium*, pp. 1-21.mos.

Zhang T., et al., (2006), "Filter-based classification of training image patterns for spatial Simulation," *Mathematical Geology* 38, 63-80.

\* cited by examiner

300

400

404

610

700

800

802

900

METHOD AND SYSTEM FOR RESERVOIR MODELING

CROSS-REFERENCE TO RELATED APPLICATION

This application is a National Stage of International Application No. PCT/US2011/037594 filed May 23, 2011, which claims the benefit of Provisional Patent Application 61/368,940, filed Jul. 29, 2010, entitled METHOD AND SYSTEM FOR RESERVOIR MODELING, the entireties of which are incorporated by reference herein.

FIELD OF THE INVENTION

Exemplary embodiments of the present techniques relate to a method and system for upscaling a reservoir model.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Hydrocarbons are widely used for fuels and chemical feed stocks. Hydrocarbons are generally found in subsurface rock formations that can be termed "reservoirs." Removing hydrocarbons from the reservoirs depends on numerous physical properties of the rock formations, such as the permeability of the rock containing the hydrocarbons, the ability of the hydrocarbons to flow through the rock formations, and the proportion of hydrocarbons present, among others.

Often, mathematical models termed "simulation models" are used to simulate hydrocarbon reservoirs and optimize the production of the hydrocarbons. The goal of a simulation model is generally to simulate the flow patterns of the underlying geology in order to optimize the production of hydrocarbons from a set of wells and surface facilities.

The simulation model is a type of computational fluid dynamics simulation where a set of partial differential equations (PDEs) which govern multi-phase, multi-component fluid flow through porous media and the connected facility network is approximated and solved.

The set of governing differential equations vary with the physical process being modeled in the reservoir. They usually include volume balance, mass conservation, and energy conservation, among others. The simulation is an iterative, time-stepping process where a particular hydrocarbon production strategy is optimized.

Reservoir simulation models multiphase flows in reservoirs. Since geological models often are quite heterogeneous and may contain hundreds of millions of cells, upscaling is often used to reduce the model size. Reducing the model size facilitates simulation by reducing the size of the problem to be solved, thereby conserving computational resources. The upscaling step generates homogenized flow properties, for example, permeability, for computational cells.

When grid coarsening is done as a way to obtain fast simulation results for sensitivity analysis or history matching, the computational cells can be quite large and may also contain localized geological features, for example, shale barriers, faults, etc. The upscaled model, though easier to simulate, is only an approximation of the original reservoir model. The errors introduced in the upscaling process may be small when flow field is relatively smooth, but could be large otherwise. One challenge in upscaling is coarsening the reservoir model for fast computational performance while maintaining a high degree of accuracy.

There are different approaches to perform upscaling for reservoir simulation. One method is based on averaging (arithmetic averaging, harmonic averaging, etc.) permeability values inside the coarse cell. To improve accuracy, upscaling may be based on flows where permeability is obtained by solving local fine scale problems while assuming single phase, incompressible and steady-state flow, with either Dirichlet or Neumann or mixed boundary conditions. A common approach involves calculating coarse permeability or face transmissibility from flow rates obtained using fine scale pressure solutions and Darcy's law.

When upscaling permeability values, assumptions are typically made about pressure or flow profiles at the boundary. For example, constant pressure values of 1 or 0 may be assigned to a boundary perpendicular to the direction for which permeability or transmissibility is to be determined A no-flow condition may be assumed on the rest of the boundaries. Unfortunately, these assumptions may result in significant upscaling errors, which may become more severe as the simulation grids become coarser. To mitigate the problem, researchers have suggested techniques such as extended local upscaling, global upscaling, local-global upscaling, etc, which are more expensive computationally but improve the accuracy.

Recently, there have been a number of research articles published on the general subject of upscaling and multiscale methods. See, for example, Aarnes, J., "Multi-scale Simulation Of Flow In Heterogeneous Oil-Reservoirs," Nov. 2004; see also, Crotti, M. A., Cobenas, R. H., "Upscaling of Relative Permeability Curves for Reservoir Simulation: An Extension to Area Simulations Based on Realistic Average Water Saturations," Society of Petroleum Engineers, presented at SPE Latin American and Caribbean Petroleum Engineering Conference, Port-of-Spain, Trinidad, West Indies, 27-30Apr. 2003; see also Qi, D., Wong, P., Liu, K., "An Improved Global Upscaling Approach for Reservoir Simulation," Petroleum Science & Technology, 2001, Volume 19, Issue 7pp. 779-795; Aarnes, J., Lie, K.-A., "Toward Reservoir Simulation on Geological Grid Models," European Conference on the Mathematics of Oil Recovery, Cannes, France, 30Aug.-2Sep. 2004.

The following paragraphs of this Background section provide specific examples of known reservoir data analysis techniques. International Patent Application Publication No. WO2008008121 by ExxonMobil Upstream Research Co., discloses simulating a physical process, such as fluid flow in porous media, by performing a fine-grid calculation of the process in a medium. The fine grid solution is reused in subsequent coarse-grid calculations. For fluid flow in subsurface formations, the method may be used to optimize upscaled calculation grids formed from geologic models. The method decreases the cost of optimizing a grid to simulate a physical process that is mathematically described by the diffusion equation.

U.S. Pat. No. 6,823,297 to Jenny, et al., discloses a multiscale finite-volume method for use in subsurface flow simulation. The method purports to solve elliptic problems with a plurality of spatial scales arising from single or multi-phase flows in porous media. Two sets of locally computed basis functions are employed. A first set of basis functions captures the small-scale heterogeneity of the underlying permeability field, and it is computed to construct the effective coarse-scale transmissibilities. A second set of basis functions is required to construct a conservative fine-scale velocity field.

The method efficiently captures the effects of small scales on a coarse grid, is conservative, and treats tensor permeabilities correctly. The underlying idea is to construct transmissibilities that capture the local properties of a differential operator. This leads to a multi-point discretization scheme for a finite-volume solution algorithm.

Transmissibilities for the MSFV method are preferably constructed only once as a preprocessing step and can be computed locally. Therefore, this step is well suited for massively parallel computers. Furthermore, a conservative fine-scale velocity field can be constructed from a coarse-scale pressure solution which also satisfies the proper mass balance on the fine scale.

A transport problem is ideally solved iteratively in two stages. In the first stage, a fine scale velocity field is obtained from solving a pressure equation. In the second stage, the transport problem is solved on the fine cells using the fine-scale velocity field. A solution may be computed on the coarse cells at an incremental time and properties, such as a mobility coefficient, may be generated for the fine cells at the incremental time. If a predetermined condition is not met for all fine cells inside a dual coarse control volume, then the dual and fine scale basis functions in that dual coarse control volume are reconstructed.

U.S. Pat. No. 6,826,520 to Khan, et al., discloses a method of upscaling permeability for unstructured grids. Permeabilities associated with a fine-scale grid of cells (representative of a porous medium) are scaled up to permeabilities associated with an unstructured coarse-scale grid of cells representative of the porous medium. An aerially unstructured, Voronoi, computational grid is generated using the coarse-scale grid as the genesis of the computational grid. The computational grid is then populated with permeabilities associated with the fine-scale grid.

Flow equations are developed for the computational grid, the flow equations are solved, and inter-node fluxes and pressure gradients are then computed for the computational grid. These inter-node fluxes and pressure gradients are used to calculate inter-node average fluxes and average pressure gradients associated with the coarse-scale grid. The inter-node average fluxes and average pressure gradients associated with the coarse grid are then used to calculate upscaled permeabilities associated with the coarse-scale grid.

SUMMARY

A method is presented for modeling reservoir properties. The method includes constructing a coarse computational mesh for the reservoir. The coarse computational mesh comprises a plurality of cells. The method further includes determining a plurality of flows for each of the plurality of cells based on Dirichlet boundary conditions. Additionally, the method includes determining a solution to a coarse pressure equation for the reservoir based on the plurality of flows.

In some embodiments, the method includes selecting a plurality of pressure points along a plurality of boundaries of the cell. The method also includes associating the plurality of pressure points with a corresponding plurality of segments. The method further includes determining a plurality of solutions to a steady-state pressure equation for the cell based on the plurality of pressure points and a first Dirichlet boundary condition. Additionally, the method includes computing a first flow rate across each of the plurality of segments based on a steady-state pressure equation solution. The method also includes determining a solution to an inhomogenous pressure equation for the cell based on a second Dirichlet boundary condition. The method additionally includes computing a second flow rate across each of the plurality of segments based on the solution to the inhomogenous pressure equation. The plurality of flows comprise the second flow rate.

In another embodiment, the second Dirichlet boundary condition specifies that a pressure is equal to 0 at the boundary. The first Dirichlet boundary condition specifies that a pressure at one of the plurality of pressure points is equal to 1. The pressure at a remaining portion of the plurality of pressure points is equal to 0. Additionally, the pressure between the plurality of pressure points is linear.

Another exemplary embodiment of the present techniques provides a system for modeling properties of a reservoir. The system may include a plurality of processors, and a machine readable medium comprising code configured to direct at least one of the plurality of processors to construct a coarse computational mesh for the reservoir. The coarse computational mesh comprises a plurality of cells. A plurality of flows may be determined for each of the plurality of cells based on Dirichlet boundary conditions. Additionally, a solution to a coarse pressure equation for the reservoir may be determined based on the plurality of flows. Further, a fine-scale flow may be reconstructed based on a multiscale approach, and the solution to the coarse pressure equation.

Another exemplary embodiment of the present techniques provides a method for producing hydrocarbons from an oil and/or gas field using an upscaling method relating to a physical structure. The method for producing hydrocarbons may include constructing a coarse computational mesh for the physical structure. The coarse computational mesh may include a plurality of cells. A plurality of flows may be determined for each of the plurality of cells based on Dirichlet boundary conditions. A solution may be determined to a coarse pressure equation for the reservoir based on the plurality of flows.

BRIEF DESCRIPTION OF THE DRAWINGS

The advantages of the present techniques are better understood by referring to the following detailed description and the attached drawings, in which.

DETAILED DESCRIPTION

Figure 1:
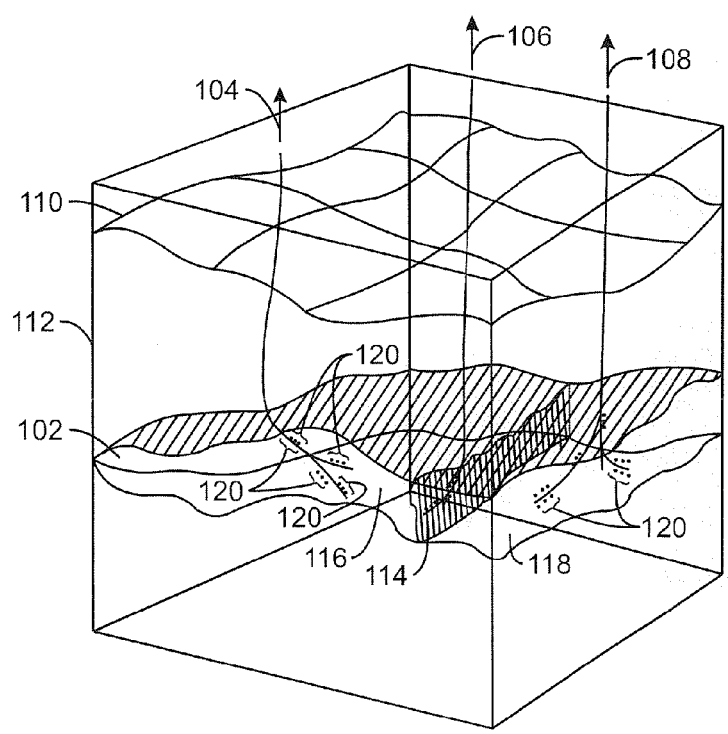
FIG. 1 is a schematic view of a reservoir, in accordance with an exemplary embodiment of the present techniques.

In the following detailed description section, the specific embodiments of the present techniques are described in connection with preferred embodiments. However, to the extent that the following description is specific to a particular embodiment or a particular use of the present techniques, this is intended to be for exemplary purposes only and simply provides a description of the exemplary embodiments. Accordingly, the present techniques are not limited to the specific embodiments described below, but rather, such techniques include all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

"Computer-readable medium" or "tangible, computer-readable medium" as used herein refers to any tangible storage and/or transmission medium that participates in providing instructions to a processor for execution. Such a medium may include, but is not limited to, non-volatile media and volatile media. Non-volatile media includes, for example, NVRAM, or magnetic or optical disks. Volatile media includes dynamic memory, such as main memory. Common forms of computer-readable media include, for example, a floppy disk, a flexible disk, a hard disk, an array of hard disks, a magnetic tape, or any other magnetic medium, magneto-optical medium, a CD-ROM, a holographic medium, any other optical medium, a RAM, a PROM, and EPROM, a FLASH-EPROM, a solid state medium like a memory card, any other memory chip or cartridge, or any other tangible medium from which a computer can read data or instructions. When the computer-readable media is configured as a database, it is to be understood that the database may be any type of database, such as relational, hierarchical, object-oriented, and/or the like.

As used herein, "to display" or "displaying" includes a direct act that causes displaying, as well as any indirect act that facilitates displaying. Indirect acts include providing software to an end user, maintaining a website through which a user is enabled to affect a display, hyperlinking to such a website, or cooperating or partnering with an entity who performs such direct or indirect acts. Thus, a first party may operate alone or in cooperation with a third party vendor to enable the reference signal to be generated on a display device. The display device may include any device suitable for displaying the reference image, such as without limitation a CRT monitor, a LCD monitor, a plasma device, a flat panel device, or printer. The display device may include a device which has been calibrated through the use of any conventional software intended to be used in evaluating, correcting, and/or improving display results (for example, a color monitor that has been adjusted using monitor calibration software). Rather than (or in addition to) displaying the reference image on a display device, a method, consistent with the present techniques, may include providing a reference image to a subject. "Providing a reference image" may include creating or distributing the reference image to the subject by physical, telephonic, or electronic delivery, providing access over a network to the reference, or creating or distributing software to the subject configured to run on the subject's workstation or computer including the reference image. In one example, the providing of the reference image could involve enabling the subject to obtain the reference image in hard copy form via a printer. For example, information, software, and/or instructions could be transmitted (for example, electronically or physically via a data storage device or hard copy) and/or otherwise made available (for example, via a network) in order to facilitate the subject using a printer to print a hard copy form of reference image. In such an example, the printer may be a printer which has been calibrated through the use of any conventional software intended to be used in evaluating, correcting, and/or improving printing results (for example, a color printer that has been adjusted using color correction software).

"Exemplary" is used exclusively herein to mean "serving as an example, instance, or illustration." Any embodiment described herein as "exemplary" is not to be construed as preferred or advantageous over other embodiments.

"Flow simulation" is defined as a numerical method of simulating the transport of mass (typically fluids, such as oil, water and gas), energy, and momentum through a physical system using a computer. The physical system includes a three dimensional reservoir model, fluid properties, the number and locations of wells. Flow simulations also require a strategy (often called a well-management strategy) for controlling injection and production rates. These strategies are typically used to maintain reservoir pressure by replacing produced fluids with injected fluids (for example, water and/or gas). When a flow simulation correctly recreates a past reservoir performance, it is said to be "history matched," and a higher degree of confidence is placed in its ability to predict the future fluid behavior in the reservoir.

"Permeability" is the capacity of a rock to transmit fluids through the interconnected pore spaces of the rock. Permeability may be measured using Darcy's Law: $Q=(k\ \Delta P\ A)/(\mu L)$, wherein $Q$=flow rate (cm3/s), $\Delta P$=pressure drop (atm) across a cylinder having a length L (cm) and a cross-sectional area A (cm2), $\mu$=fluid viscosity (cp), and k=permeability (Darcy). The customary unit of measurement for permeability is the millidarcy. The term "relatively permeable" is defined, with respect to formations or portions thereof, as an average permeability of 10 millidarcy or more (for example, 10 or 100 millidarcy). The term "relatively low permeability" is defined, with respect to formations or portions thereof, as an average permeability of less than about 10 millidarcy. An impermeable layer generally has a permeability of less than about 0.1 millidarcy.

"Pressure" is a pressure generated by a fluid in a formation.

"Reservoir" or "reservoir formations" are typically pay zones (for example, hydrocarbon producing zones) that include sandstone, limestone, chalk, coal and some types of shale. Pay zones can vary in thickness from less than one foot (0.3048 m) to hundreds of feet (hundreds of m). The permeability of the reservoir formation provides the potential for production.

"Reservoir properties" and "reservoir property values" are defined as quantities representing physical attributes of rocks containing reservoir fluids. The term "reservoir properties" as used in this application includes both measurable and descriptive attributes. Examples of measurable reservoir property values include porosity, permeability, water saturation, and fracture density. Examples of descriptive reservoir property values include facies, lithology (for example, sandstone or carbonate), and environment-of-deposition (EOD). Reservoir properties may be populated into a reservoir framework to generate a reservoir model.

"Simulation model" refers to a specific mathematical representation of a real hydrocarbon reservoir, which may be considered to be a particular type of geologic model. Simulation models are used to conduct numerical experiments (reservoir simulations) regarding future performance of the field with the goal of determining the most profitable operating strategy. An engineer managing a hydrocarbon reservoir may create many different simulation models, possibly with varying degrees of complexity, in order to quantify the past performance of the reservoir and predict its future performance.

"Transmissibility" refers to the volumetric flow rate between two points at unit viscosity and pressure-drop. Transmissibility is a useful measure of connectivity. Transmissibility between any two compartments in a reservoir (fault blocks or geologic zones), or between the well and the reservoir (or particular geologic zones), or between injectors and producers, can all be useful for understanding connectivity in the reservoir.

"Well" or "wellbore" includes cased, cased and cemented, or open-hole wellbores, and may be any type of well, including, but not limited to, a producing well, an experimental well, an exploratory well, and the like. Wellbores may be vertical, horizontal, any angle between vertical and horizontal, deviated or non-deviated, and combinations thereof, for example a vertical well with a non-vertical component. Wellbores are typically drilled and then completed by positioning a casing string within the wellbore. Conventionally, the casing string is cemented to the well face by circulating cement into the annulus defined between the outer surface of the casing string and the wellbore face. The casing string, once embedded in cement within the well, is then perforated to allow fluid communication between the inside and outside of the tubulars across intervals of interest. The perforations allow for the flow of treating chemicals (or substances) from the inside of the casing string into the surrounding formations in order to stimulate the production or injection of fluids. Later, the perforations are used to receive the flow of hydrocarbons from the formations so that they may be delivered through the casing string to the surface, or to allow the continued injection of fluids for reservoir management or disposal purposes.

Overview

Exemplary embodiments of the present techniques relate to methods and systems for upscaling and simulating flows in reservoirs. The techniques may upscale, i.e., coarsen, reservoir models while preserving accuracy for flow calculations.

FIG. 1 is a schematic view 100 of a reservoir 102, in accordance with an exemplary embodiment of the present techniques. The reservoir 102, such as an oil or natural gas reservoir, can be a subsurface formation that may be accessed by drilling wells 104, 106, and 108 from the surface 110 through layers of overburden 112. The reservoir 102 may have one or more faults 114 dividing areas, for example regions 116 and 118, and which may either restrict or enhance the flow of hydrocarbons.

The wells 104, 106, and 108 may be deviated, such as being directionally drilled to follow the reservoir 102. Further, the wells can be branched to increase the amount of hydrocarbon that may be drained from the reservoir, as shown for wells 104 and 108. The wells 104, 106, and 108, can have numerous areas with perforations 120 (indicated as dots next to the wells) to allow hydrocarbons to flow from the reservoir 102 into the wells 104, 106, and 108 for removal to the surface.

Figure 2:
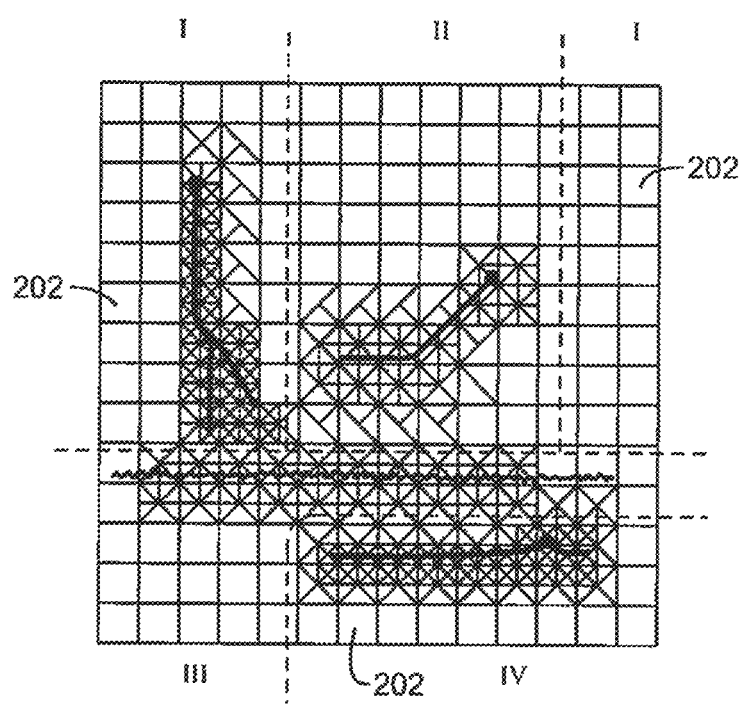
FIG. 2 is a top view of a reservoir showing a planar projection of a computational mesh over the reservoir, in accordance with an exemplary embodiment of the present techniques.

FIG. 2 is a top view of a reservoir showing a planar projection of a computational mesh 200 over the reservoir, in accordance with an exemplary embodiment of the present techniques. Although the computational mesh 200 is shown as a two dimensional grid of computational cells (or blocks) 202 to simplify the explanation of the problem, it should be understood that the actual computational mesh 200 can be a three dimension matrix of computational cells 202 that encompasses the reservoir.

A computational cell 202 is a single two or three dimensional location within a simulation model that represents a physical location and volume in a reservoir. The computational cell 202 may have associated properties, such as porosity or oil content, which is assumed to be a single value over the entire computational cell 202 and is assigned to the center of the computational cell 202.

The computational cells 202 may interact with adjacent computational cells 202, for example, by having flux properties assigned to a shared border with the adjacent computational cells 202. For example, the flux properties may include mass transfer, flow values, pressure, and the like.

Reservoir models may be coarsened while preserving a high degree of accuracy for flow calculations by deriving expressions for flow rates as linear functions. The linear functions may be based on discrete pressure values at multiple pressure points along cell boundaries, and at the center of each of the cells. The number of pressure points at the boundary used in exemplary embodiments of the invention may be flexible. Pressure points may be selected such that their pressure values provide an adequate representation of the possible pressure profiles and flow distributions.

Because the selected pressure points may adequately represent pressure profiles and flow distributions, assumptions that are typically made about flow behavior at the coarse cell or reservoir boundary may be avoided. This approach may provide a particular advantage in reservoir models that have high permeability streaks, or that are highly channelized.

Exemplary embodiments of the present techniques may provide several advantages. Pressure solutions may approximate more closely the fine-scale reference solutions if the pressure behavior is properly captured along the coarse block boundaries. Because of reduction in space dimension, accurate pressure discretization along those boundaries may be achieved with a fewer number of pressure points than that for the entire interior of the reservoir, which traditional approaches use.

The conventional method of refining either locally or globally the simulation model for accuracy improvement often creates small simulation cells which tend to restrict the time step size during the simulation. An exemplary embodiment of the invention avoids this problem because it works by inserting discretization points along the coarse cell boundaries while keeping the simulation grid unchanged.

Exemplary embodiments of the present techniques may be accurate even for very coarse grids, and may be applicable to coarse cells of arbitrary shape or geometry. In particular, boundaries of coarse cells may be curves (2D) or surfaces (3D).

Exemplary embodiments of the present techniques may only solve for pressure solutions within each coarse cell. As such, parallelization may be easier than methods which rely on global solutions.

Additionally, by adopting a multi-scale computational framework, exemplary embodiments of the present techniques may allow reconstruction of fine-scale velocity fields for solving transport equations of multiphase flow problems.

Figure 3:
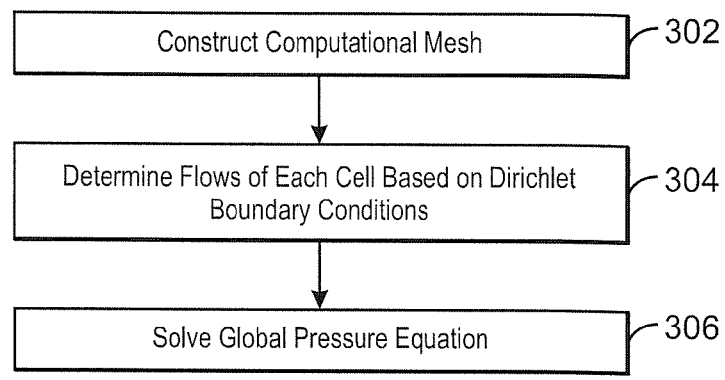
FIG. 3 is a process flow diagram of a method for upscaling a reservoir model, in accordance with an exemplary embodiment of the present techniques.

FIG. 3 is a process flow diagram of a method 300 for upscaling a reservoir model, in accordance with an exemplary embodiment of the present techniques. The method 300 may be used for two-dimensional (2D) or three-dimensional (3D) reservoir models. However, for clarity, the description below assumes a 2D reservoir.

The method 300 may begin at block 302, where a computational mesh may be constructed. The computational mesh may be a generally coarse mesh (in comparison to a fine-mesh of the model) with straight (flat for 3D) or curved cell boundary geometries.

In an exemplary embodiment of the invention, coarse meshes may be constructed so that cells may align with faults, shale, or flow streamlines, which, generally, have irregular shapes. As such, the method 300 may provide simulation engineers flexibility in optimizing computational grids through the construction of computational mesh with irregular shapes.

Figure 4A:
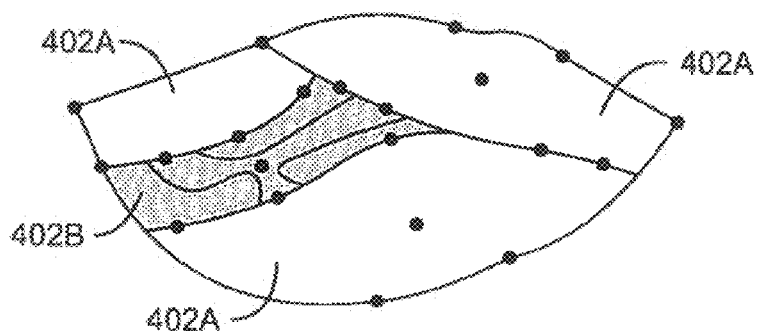
FIG. 4A is a block diagram of a reservoir model, in accordance with an exemplary embodiment of the current techniques.
Figure 4B:
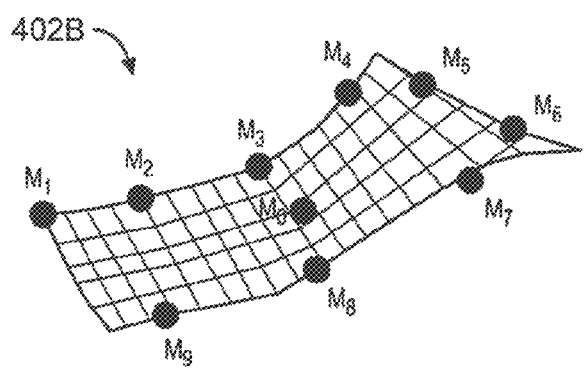
FIG. 4B is a block diagram of the cell, in accordance with an exemplary embodiment of the current techniques.

FIG. 4A is a block diagram of a reservoir model 400, in accordance with an exemplary embodiment of the current techniques. The reservoir model 400 includes a computational mesh of coarse grid blocks, or cells 402A and 402B, with irregular boundary geometry. FIG. 4B is a block diagram 404 of the cell 402B, which includes pressure points $M_1$-$M_9$ on the boundaries, and pressure point $M_0$ at the center.

At block 304, flows may be determined for each cell 402A and 402B of the model 400 using a finite difference or finite element method. In an exemplary embodiment of the invention, steady state pressure equation is solved using Dirichlet boundary conditions to obtain a general rate versus pressure relationship at the boundary.

Since rate values at the boundary may be used as Neumann boundary condition, the relationship may also be regarded as a mapping from Dirichlet to Neumann conditions. This relationship mathematically represents the effect of reservoir heterogeneity on flow, and is referred to herein as Dirichlet Neumann Representation (DNR). The block 304 is described in greater detail with reference to FIG. 5.

At block 306, a global coarse solution for pressure may be calculated with a specified Dirichlet or Neumann condition at a reservoir boundary. As understood by one skilled in the art, pressure, flow rate, and saturation changes in the case of multiphase flow may be calculated for each coarse cell using the flow determined at block 304.

Figure 5:
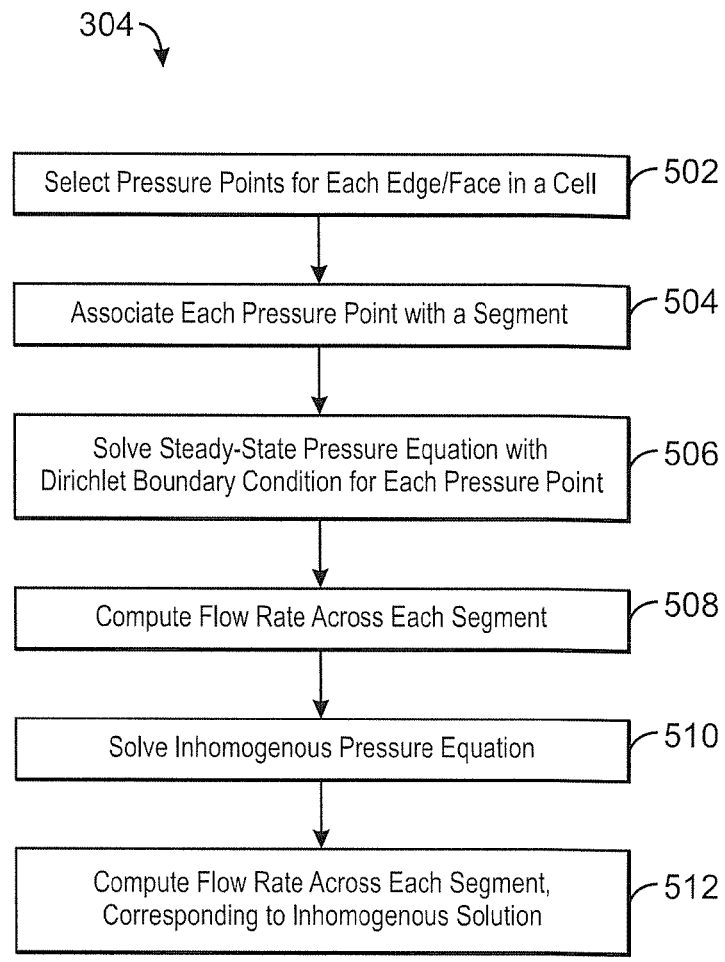
FIG. 5 is a process flow diagram of a block for determining the flows for each cell in the mesh, in accordance with an exemplary embodiment of the present techniques.

FIG. 5 is a process flow diagram of the block 304 for determining the flows for each cell in the mesh, in accordance with an exemplary embodiment of the present techniques.

At block 502, pressure points may be selected for each edge in a cell. For a 3D reservoir model, pressure points may be selected for each face in a cell.

Obviously, the new method is computationally more expensive compared to existing upscaling methods for models with the same number of coarse cells. To justify the cost, it is shown below that the new method provides significantly better accuracy than even finer upscaled models (with comparable number of unknown variables) using traditional approaches. The key in achieving that objective lies in the selection of DNR pressure points.

In an exemplary embodiment of the invention, the pressure points selected may be located where pressure matters most to the flow. Since high flow rate is usually observed in regions where the permeability value is large, a reasonable strategy is to select more pressure points where permeability is high. Accordingly, where permeability is low, there may be few or no pressure points selected.

In another exemplary embodiment of the invention, constant parameters a, b, c, and d may be used to select the pressure points. In such an embodiment, the pressure points selected may be based on the following rules: 1) For each side of a coarse cell with permeability or all entries of permeability tensor less than a everywhere, the mid-point of the side may be selected as the only pressure point, 2) For sides with permeability or some entries of permeability tensor greater than a, the two end points of the side are also designated as DNR pressure points regardless of the permeability values at the end points, and 3) For each side of a coarse cell with permeability or some entries of permeability tensor greater than a, the point ($M_x$) with the maximum permeability value ($k_{max}$) may be chosen as a first pressure point of the side. Away from $M_x$, additional points may be selected along the side with a spacing, h, that depends on the value of k as well as change (δk) in k, according to the following:

$$h = \min\left\{\frac{b}{1 + c(k_m - a)^2}, \frac{d}{1 + c\delta k_m^2}\right\} \quad \text{Equation 1}$$

where $k_m$ is equal to k (scalar) or the maximum entry of the permeability tensor, and similarly for $\delta k_m$. The accuracy of exemplary embodiments of the invention may depend on how well pressure behavior is captured at the coarse cell boundary. Qualitatively, a coarse scale solution may approach the accuracy of a fine scale solution as more pressure points are selected on the boundary. In fact, the coarse scale solution may be identical to the fine scale solution if a pressure point is selected from each fine cell located at the boundary of the coarse cell.

Though with existing methods, coarse flow solutions generally also approach the reference solutions by simply gridding the reservoir model more finely. Advantageously, accurate pressure discretization along coarse boundaries may be achieved with fewer pressure points than that for the entire interior of the coarse block because of reduction (by 1) in space dimension.

At block 504, each pressure point may be associated with a segment. The start and end points of the segment for a pressure point, $M_i$, may be either the mid-point between $M_i$ and its immediate neighbors ($M_{i-1}$ and $M_{i+1}$) or a vertex point of the coarse grid if there exists one on the boundary between $M_i$ and $M_{i+1}$ (or $M_i$ and $M_{i-1}$).

Figure 6A:
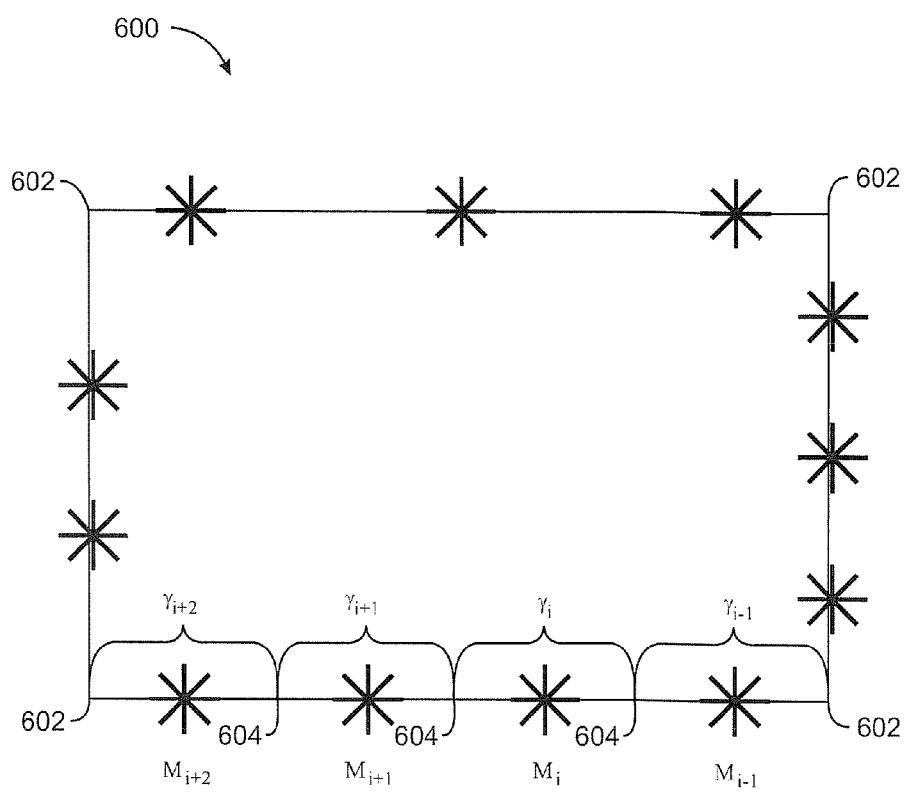
FIG. 6A shows a cell, in accordance with an exemplary embodiment of the current techniques.

For example, FIG. 6A shows a cell 600 with pressure points, $M_{i-1}$, $M_i$ and $M_{i+1}$. Other points in the cell 600 may include vertex points 602, and mid-points 604. The mid-points 604 may represent a mid-point between $M_i$ and $M_{i-1}$ and a mid-point between $M_i$ and $M_{i+1}$. The segments associated for each pressure point are labeled, respectively, $\gamma_{i-1}$, $\gamma_i$, and $\gamma_{i+1}$. The segment, $\gamma_{i-1}$, lies between a vertex 602 of the coarse grid, and the mid-point between $M_{i-1}$ and $M_i$. The segment, $\gamma_i$, lies between the mid-point between $M_{i-1}$ and $M_i$, and the mid-point between $M_i$ and $M_{i+1}$. Additionally, the segment, $\gamma_{i+2}$, lies between a vertex 602 of the coarse grid, and the mid-point between $M_{i+1}$ and $M_{i+2}$.

Referring back to FIG. 5, at block 506, a steady-state pressure equation may be solved, with a Dirichlet boundary condition, for each coarse cell and pressure point $M_i$ at the boundary of the cell. The steady-state pressure equation may be represented as:

$$-\nabla \cdot k \nabla p = 0 \qquad \text{Equation 2}$$

where permeability k may be a scalar or a tensor. The Dirichlet boundary condition may be represented as $p(M_j) = \delta_{ij}$, where $\delta_{ij}=1$ for i=j and $\delta_{ij}=0$ for i≠j. For any point between two neighboring pressure points along a boundary, p may vary linearly with respect to distance from those points.

In an exemplary embodiment of the invention, flow rates at the boundary of the coarse cell should be computed based on the harmonic average of fine scale permeability values from the two sides of the boundary if it lies in the interior of the reservoir and when k is a scalar. When k is a tensor, a multi-point flow approximation treatment should be applied for that purpose.

Figure 6B:
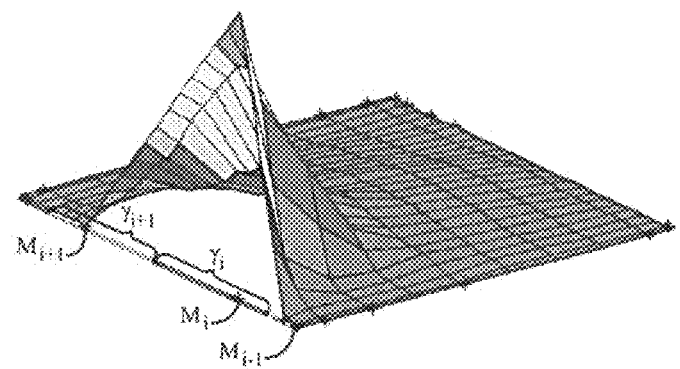
FIG. 6B shows pressure solutions for the cell, in accordance with an exemplary embodiment of the present techniques.

FIG. 6B shows a pressure solution 610 for the cell 600, in accordance with an exemplary embodiment of the present techniques. As shown, the Dirichlet boundary condition at the pressure point $M_i$ is 1, and 0 at $M_{i-1}$ and $M_{i+1}$.

Referring back to FIG. 5, at block 508, flow rate may be computed across each segment. The segment flow rate, denoted as ($F_{j,i}$) below, is computed from the pressure solution for the associated pressure point, denoted as $\chi_i(x,y)$ below, as $$F_{j,i} = -\int_{l_j} \vec{n} k \nabla \chi_i \, dl, \qquad \text{Equation 3}$$

where $\vec{n}$ is outward normal vector of segment $\gamma_j$, A tensor analogous to classical permeability may also be defined based on $F_{j,i}$ for the coarse block:

$$k_{j,i}^c = -\frac{F_{j,i} D_i}{l_j}, \qquad \text{Equation 4}$$

where $l_j$ is the length of $\gamma_j$ and $D_i$ is the length of the two sides of the rectangle adjacent to $M_i$.

At block 510, an inhomogenous pressure equation may be solved for the coarse cell. After $\chi_i(x,y)$ and $F_{j,i}$ are obtained for all points $M_i$ (1≤i≤n) and segments $\gamma_j$, the inhomogeneous version of the pressure equation:

$$-\nabla \cdot k \nabla p = 1 \qquad \text{Equation 5}$$

may be solved with a zero Dirichlet pressure condition at every pressure point, along the boundary of the cell. At block 512, the segment flow rates corresponding to the inhomogenous solution may be computed, as described above. The resulting pressure solution and segment flow rates for the inhomogeneous problem are denoted as $\chi_0(x,y)$ and $F_{j,0}$, respectively.

In an exemplary embodiment of the invention, flow rates at the boundary of the coarse cell should be computed based on the harmonic average of fine scale permeability values from the two sides of the boundary if it lies in the interior of the reservoir and when k is a scalar. When k is a tensor, a multi-point flow approximation treatment should be applied for that purpose.

Referring back to FIG. 3, as stated previously, at block 306 a solution for pressure may be calculated. After the local DNR calculations are completed, the original single-phase pressure equation, $$-\nabla \cdot k \nabla p = f \qquad \text{Equation 6}$$

where permeability k may be a scalar or a tensor variable, may be cast into discrete forms and solved. In EQUATION 6, k is permeability, p is pressure and f is source or sink term. For the sake of clarity, the following discussion uses segment flow rates $F_{j,i}$ directly rather than the permeability tensor $k_{j,i}^c$ (EQUATION 4) because equations have a simpler form when written in terms of $F_{j,i}$.

In an exemplary embodiment of the invention, EQUATION 6 may be solved by finding a multiplier ($\beta_i$, 1≤i≤n) corresponding to each pressure point along the edges and multiplier ($\beta_0$) for each cell so that pressure, defined as:

$$p = \sum_{i=0}^{n} \beta_i \chi_i, \qquad \text{Equation 7}$$

honors local mass conservation for the cell:

$$\sum_{j=1}^{n} F_j = A \cdot f, \qquad \text{Equation 8}$$

where A is cell area and $F_j$ is flow rate across segment $\gamma_j$ given by:

$$F_j = \sum_{i=0}^{n} \beta_i F_{j,i} \qquad \text{Equation 9}$$

In addition to mass conservation, the constraint of flow continuity between neighboring cells for each cell boundary segment may be used:

$$\sum_{i=0}^{n_-} \beta_i^- F_{j,i}^- = -\sum_{i=0}^{n_+} \beta_i^+ F_{j,i}^+ \qquad \text{Equation 10}$$

where superscripts $^-$ and $^+$ indicate that summation takes place for cells sharing the boundary segment, and $\beta^- = \beta^+$ at pressure points along the shared edge. It should be noted that, by definition of $\chi_i(x,y)$, $p_i = \beta_i$ for points along the edges. Additionally, EQUATION 8 may be simplified:

$$\beta_0 \sum_{j=1}^{n} F_{j,0} = A \cdot f \qquad \text{Equation 11}$$

because all pressure solutions $\chi_i(x,y)$ have zero net flow except for i=0.

EQUATIONS 8 and 10 bear some resemblance to the equations for mixed finite element method (MFEM). However, in exemplary embodiments of the techniques described herein, the number and locations of points on the edge are flexible. In contrast, for MFEM, pressure unknowns on edges (faces) correspond to edge (face) average values.

Further, for segments at the boundary of the simulation domain, either a Dirichlet pressure condition:

$$\beta_j = g_D \quad \text{Equation 12}$$

or a Neumann flux condition $$\sum_{i=0}^{n} \beta_i F_{j,i} = l_j g_N \quad \text{Equation 13}$$

may be imposed, where $g_N$ is flux specified at the boundary. Equations 8-13 form a coupled system for all coarse cell unknowns $\beta_i$. As such, in an exemplary embodiment of the invention, Equations 8-13 may be solved simultaneously using a linear solver. In such an embodiment, after $\beta_i$ are solved, values of pressure for cells and pressure points, and flow rates may be recovered using Equations 7 and 9, respectively.

In an exemplary embodiment of the invention, multiphase flows in reservoirs may be simulated. In such an embodiment, Equation 8 may be modified to account for effects of relative permeability, gravity, etc. to fluid flows. One way to derive the discretized pressure equation is using volume balance. First, flow rate through a boundary segment $\gamma_j$ for phase v is $$F_j^v = \frac{k_{rv}(S)}{\mu_v}\left[F_{j,0}\left(\beta_0 - \frac{g\rho_v h_0 - \sum_{i=1}^{n} g\rho_v d_i \chi_i(M_0)}{\chi_0(M_0)}\right) + \sum_{i=1}^{n} F_{j,i}(\beta_i - g\rho_v d_i)\right] \quad \text{Equation 14}$$

where $k_{rv}$ is relative permeability (may be upstream weighted) for phase v, $\mu_v$ is viscosity, $\rho_v$ is phase density, $d_i$ is depth of the cell (i=0) and DNR pressure points (i>0) on the boundary, and $\chi_0(M_0)$ is DNR pressure solution $\chi_0(x,y)$ evaluated at the cell center. Alternative to superposition, Eq. (2) may be modified to account for the gravity effect and then a Dirichlet problem with zero pressure boundary condition is solved on the coarse cell to obtain a gravity correction ($F_{j,v,g}$) to flow solution. Using that solution, phase flow rate through a DNR boundary segment $\gamma_j$ can be written as $$F_j^v = \frac{k_{rv}(S)}{\mu_v}\left[\sum_{i=0}^{n} \beta_i F_{j,i} + F_{j,v,g}\right].$$

Mass flow rates U may be computed from phase flow rates as:

$$U_{\alpha,j} = \sum_{v=1}^{\omega} \xi_{\alpha,v} F_j^v \quad \text{Equation 15}$$

where $\xi$ is phase component density. The counterpart of EQUATION 8 for multiphase fluid flow may be the following volume balance equation:

$$\sum_{i=0}^{n}\left[\frac{\partial v_t}{\partial p_0}\frac{\partial p_0}{\partial \beta_i} - dt\sum_{a=1}^{m}\sum_{j=0}^{n}\left(\frac{\partial v_t}{\partial n_\alpha} \cdot \frac{\partial U_{\alpha,j}}{\partial \beta_i}\right) - \frac{\partial v_p}{\partial p_0}\frac{\partial p_0}{\partial \beta_i}\right]\delta\beta_i = \quad \text{Equation 16}$$

-continued $$r(v_p^0 - v_t^0) + \sum_{\alpha,j}\frac{\partial v_t}{\partial n_\alpha}dt \cdot U_{\alpha,j}^0$$

where $v_t$, $v_p$, $p_0$, $n_\alpha$, dt, and r are total cell fluid volume, pore volume, cell pressure, mass for component a, time step size, and relaxation factor, respectively, and superscript $^0$ indicate the beginning of time step value.

In an exemplary embodiment of the invention, multiphase flow equations may be solved adopting a multi-scale computational framework. Specifically, after coarse-scale pressure equations, Equations 8-13, are solved, flow across each coarse boundary segment may be recovered by using Equation 9. For cells sharing a common boundary segment, Equation 10 may ensure that the same value for $F_j$ is obtained regardless of whether Equation 9 is evaluated for the cell on the left side or the cell on the right side. This embodiment is described in greater detail with reference to FIG. 7.

Figure 7:
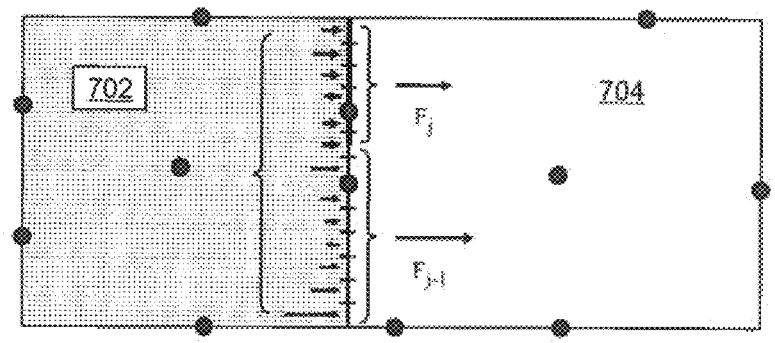
FIG. 7 is a block diagram of neighboring coarse cells, in accordance with an exemplary embodiment of the present techniques.

FIG. 7 is a block diagram 700 of neighboring coarse cells 702, 704, in accordance with an exemplary embodiment of the present techniques. For multi-scale calculations to proceed, $F_j$ may be decomposed into fine-scale flows along the coarse cell boundary.

This decomposition may be achieved in two steps. First, fine scale flow at the boundary may be computed using pressure basis functions $\chi_i(x,y)$ for each fine cell (w) on the left side 702

$$F_{w,j}^- = -\sum_{i=0}^{n_-} \beta_i^- l_w \vec{n}_j k_w^- \nabla \chi_i^- \quad \text{Equation 17}$$

where $l_w$ and $\vec{n}_w$ are length and outward normal vector of fine-scale boundary segment w of the coarse cell. For clarity, j and w are used here as indices for a DNR segment associated with a pressure point of a coarse cell and a fine-scale segment as part of the coarse cell boundary, respectively. Similarly, $F_{w,j}^+$ can be obtained for the cell on the right side 704. The sums of fine-scale flow rate from each side should be equal to the respective coarse segment flow rates and so are the same, even though $F_{w,j}^-$ and $F_{w,j}^+$, in general, may have different profiles.

To obtain a consistent fine-scale flow distribution $F_{w,j}$ at the boundary, the second step is to perform averaging over $F_{w,j}^-$ and $F_{w,j}^+$. For example, harmonic averaging may be used $$F_{w,j} = \psi \frac{2 * F_{w,j}^- * F_{w,j}^+}{F_{w,j}^- + F_{w,j}^+} \text{ if } F_{w,j}^- * F_{w,j}^+ > 0 \text{ and } 0 \text{ otherwise} \quad \text{Equation 18}$$

where $\psi$ is a scaling factor to ensure that the integral of fine-scale fluxes for the DNR segment is equal to $F_j^-$ ($F_j^+$). Once fine-scale flow at the boundary is determined, fine-scale pressure equation may be solved to obtain the velocity field within each coarse cell which, in turn, may be used to compute phase saturation changes in the reservoir. This method of reconstructing fine-scale flow has the following desirable properties: Mass balance is satisfied for the entire reservoir. No artificial source or sink needs to be introduced when solving the Neumann problem for reconstructing fine-scale flow within coarse cells in the interior of the reservoir. By construction, coarse scale solution is consistent with the source/sink term in the pressure equation. The derived fine-scale flow boundary condition is also consistent with the source/sink term. Further, multi-scale calculations may be performed without a dual grid.

Figure 8A:
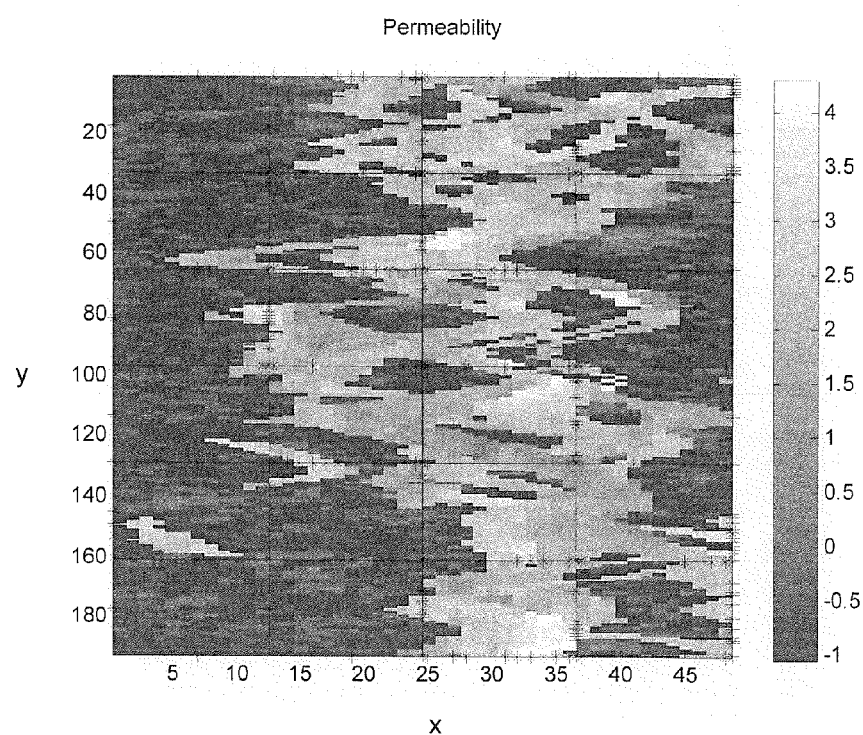
FIG. 8A is a graph showing permeability of a reservoir in log scale, in accordance with an exemplary embodiment of the present techniques.

FIG. 8A is a graph 800 showing permeability of a reservoir, in accordance with an exemplary embodiment of the present techniques. For clarity, all coarse grids for the reservoir are represented in Cartesian coordinates. Also for clarity, the cells are uniform in size. The reservoir modeled in FIG. 8A is a 2D channelized reservoir model. The cells are shaded by permeability values in logarithmic scale. The pressure points are shown along boundaries of coarse cells, and are marked with a "*".

In this example, the 2D geological model has 9216 (48× 192) rectangular cells. In the upscaling example presented here, the coarse simulation grid has 24 (4×6) cells, with each coarse cell containing 384 (12×32) fine cells.

For DNR calculations, a total of 230 pressure points at the cell boundaries are selected.

After local DNR calculations are completed for each pressure point, a global single phase, steady state problem is set up for testing accuracy. For the left and top sides of the reservoir, a pressure boundary condition may be:

$$p(x, y) = 1000 \sin\left(\frac{l}{L}\right), \quad \text{Equation 19}$$

where l=x (top side) or l=y (left side) and L is the length of the side, while p=0 at the bottom and right sides. Fine-scale pressure solution is shown in FIG. 8B.

Figure 8B:
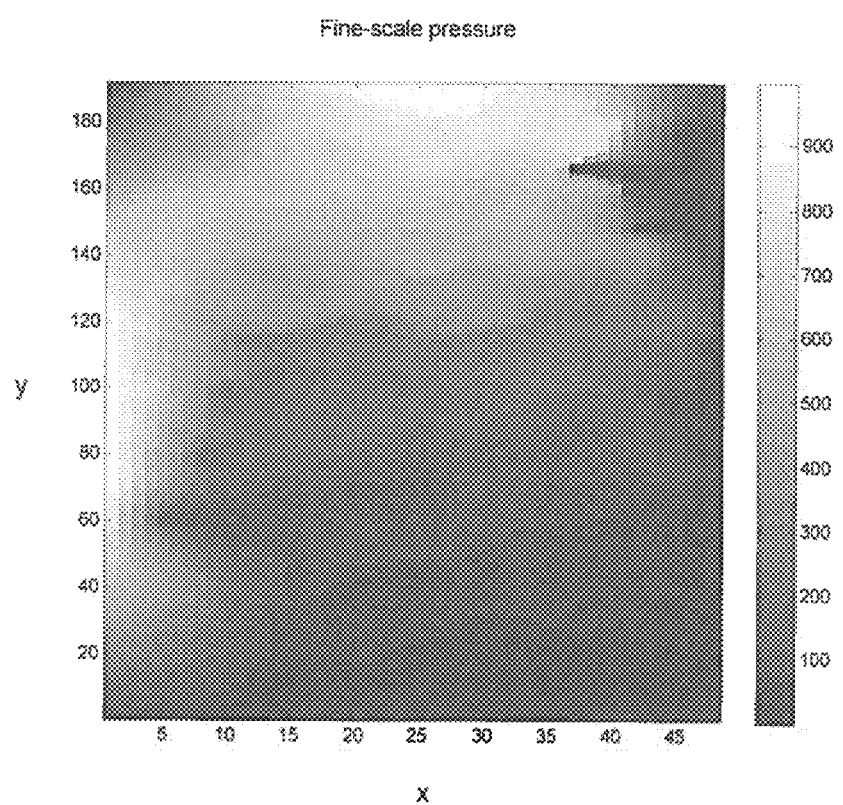
FIG. 8B is a graph showing fine-scale pressure of a reservoir, in accordance with an exemplary embodiment of the present techniques.

FIG. 8B is a graph 802 showing fine-scale pressure of the reservoir, in accordance with an exemplary embodiment of the present techniques. Intuitively, corresponding to this boundary condition, flow should move from left to right and from top to bottom. The total flow rates calculated for each side of the reservoir are listed in Table 1. Exemplary embodiments of the present techniques are referred to as Dirichlet Neumann Representation (DNR).

TABLE 1

|  | FBSA-L | FBSA-G | FBSA-MPFA | DNR | Fine Scale |
| --- | --- | --- | --- | --- | --- |
| LEFT | −1.18453 | −0.996736 | −1.25196 | −0.646239 | −0.751156 |
| TOP | −53.6648 | −53.8014 | −60.8188 | −75.9059 | −74.5775 |
| RIGHT | 53.3587 | 52.8838 | 59.554 | 74.2344 | 73.4171 |
| BOTTOM | 1.49064 | 1.9143 | 2.51682 | 2.31773 | 1.91154 |

As shown, the selected pressure points are mostly selected either from locations in the interior of coarse cell edges with a high permeability value or near the vertices of the coarse grid.

For comparison, a local flow based upscaling method (FBSA-L), a crude version of FBSA using global pressure solution and two-point flux approximation (FBSA-G), and a MPFA-type method derived from multiscale approaches that solve reduced PDE to obtain pressure boundary condition around each interaction region (FBSA-MPFA) were implemented for the model represented with respect to FIG. 8A. It should be noted that many variants of local and global upscaling techniques are used today. No attempts have been made to optimize FBSA-L, FBSA-G, or FBSA-MPFA implemented here.

In the test, a validation was performed whereby an exemplary embodiment of the present techniques was first applied to reservoir models with a constant permeability value, and then to models with a permeability distribution constant in one direction, but alternating between two different values in the other direction. In those cases, exact solutions may be found analytically for linear pressure boundary conditions and all methods are expected to reproduce exactly or nearly exactly fine scale reference solutions. After validation, an exemplary embodiment of the present techniques was applied.

As shown, all methods predict correctly the direction of flow. However, the DNR method produced the most accurate results when compared to the fine scale solution.

It should be noted that the accuracy improvement observed here for Dirichlet Neumann representation cannot be totally attributed to the use of more pressure unknowns. As a simple demonstration, the different methods were applied to the same reservoir with a less coarse simulation grid consisting of 288 (12×24) cells, each containing 32 (4×8) fine cells. For this simulation grid, the number of pressure unknowns employed for FBSA-type methods is 288, which is more than the total number of unknowns used in Dirichlet Neumann representation for the previous coarser (4×6) model. The same Dirichlet boundary condition is used. Results in Table 2 clearly show that rates obtained using DNR on the coarser grid is still more accurate compared to those using FBSA type methods on the finer grid.

TABLE 2

|  | FBSA-L | FBSA-G | FBSA-MPFA | DNR | Fine Scale |
| --- | --- | --- | --- | --- | --- |
| LEFT | −0.774217 | −0.735045 | −0.805819 | −0.682272 | −0.751156 |
| TOP | −68.9214 | −65.6086 | −68.3937 | −74.5596 | −74.5775 |
| RIGHT | 67.4376 | 63.3531 | 70.3898 | 73.1965 | 73.4171 |
| BOTTOM | 2.258 | 2.99053 | −1.19029 | 2.04539 | 1.91154 |

It should also be noted that although DNR captures more accurately the pressure behavior at the boundary of the reservoir due to the presence of pressure unknowns along the edges, that fact alone is not significant enough to be responsible for the accuracy improvements observed in Tables 1-2. To demonstrate this point, the heterogeneous permeability field is replaced with a constant permeability value of 100 (md), while the pressure boundary condition for the reservoir is kept the same. The results in Table 3 show all methods perform reasonably well, indicating that pressure profile at the boundary is resolved satisfactorily.

TABLE 3

|        | FBSA-L   | FBSA-G   | FBSA-MPFA | DNR      | Fine Scale |
|--------|----------|----------|-----------|----------|------------|
| LEFT   | −134.228 | −134.228 | −134.055  | −133.827 | −133.87    |
| TOP    | −149.578 | −149.578 | −149.447  | −150.98  | −151.225   |
| RIGHT  | 209.37   | 209.37   | 209.004   | 210.228  | 210.465    |
| BOTTOM | 74.4358  | 74.4358  | 74.4977   | 74.5784  | 74.6299    |

In the testing, it is further observed that both flow behavior along the boundary, and flow distribution, change with pressure condition at the boundary of the reservoir. This fact makes it difficult to construct, using existing upscaling methods, an efficient simulation grid that can accurately capture the time-dependent flow behaviors during multiphase flow simulation. In contrast, the Dirichlet Neumann representation can produce substantially more accurate results because it can efficiently approximate the dynamic pressure and flow distributions without changing the computational grid.

Figure 9A:
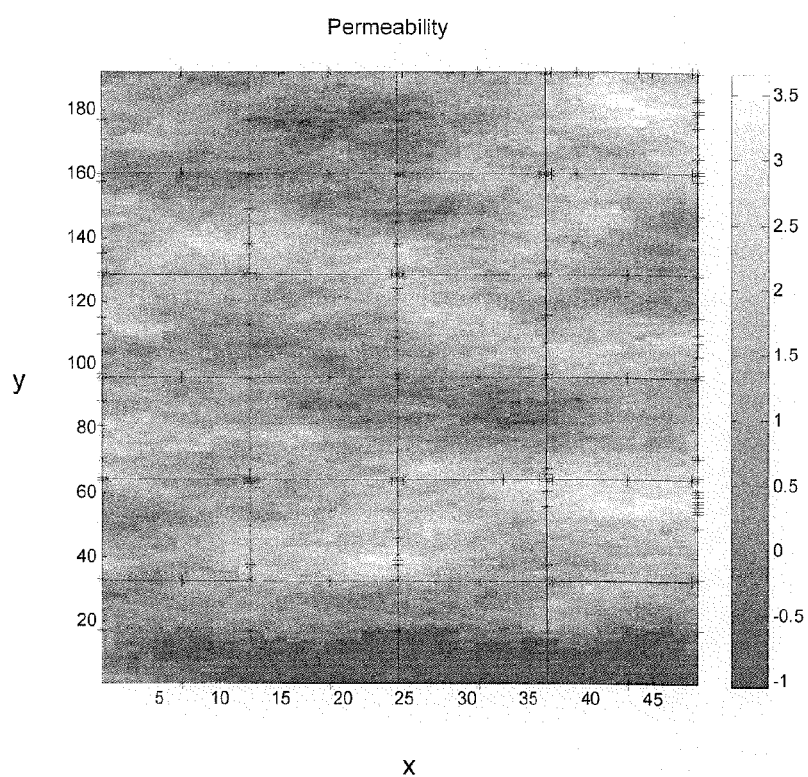
FIG. 9A is a graph showing permeability of a reservoir in log scale, in accordance with an exemplary embodiment of the present techniques.

The second test was run using a different reservoir model. FIG. 9A is a graph 900 showing permeability of a reservoir, in accordance with an exemplary embodiment of the present techniques. The reservoir modeled in FIG. 9A contains pockets of high permeability and low permeability which are not well connected to each other. For the DNR method, 146 pressure points were selected.

Figure 9B:
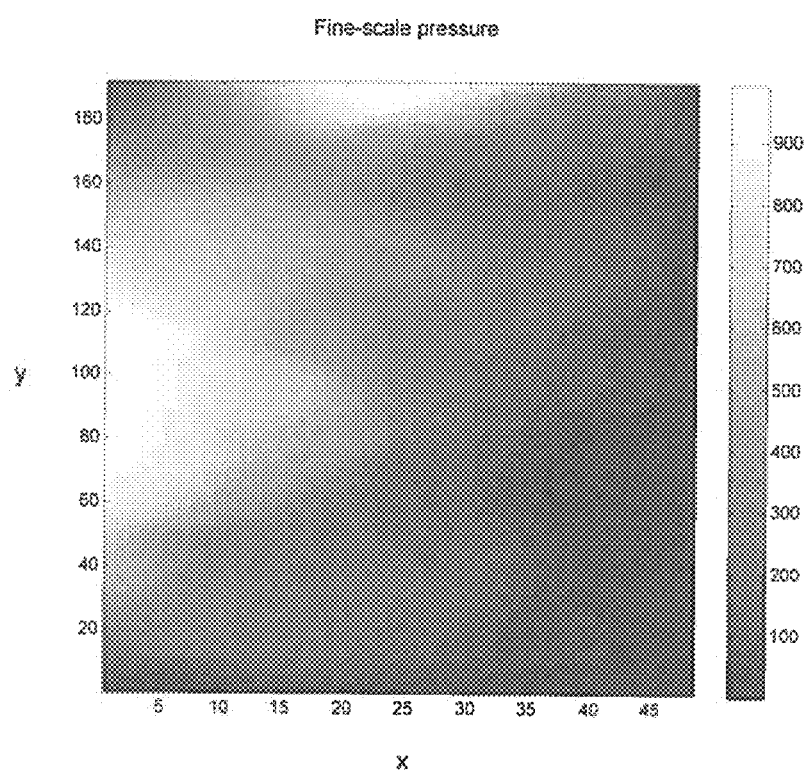
FIG. 9B is a graph showing fine-scale pressure of a reservoir, in accordance with an exemplary embodiment of the present techniques.

FIG. 9B is a graph 902 showing fine-scale pressure of the reservoir, in accordance with an exemplary embodiment of the present techniques. Because permeability distribution is better organized spatially for this reservoir, less fingering is observed in the pressure profile as compared to that shown in FIG. 8B.

Values of total flow rate calculated for each side of the reservoir using a 4×6 grid are listed in Table 4.

TABLE 4

|        | FBSA-L   | FBSA-G    | FBSA-MPFA | DNR      | Fine Scale |
|--------|----------|-----------|-----------|----------|------------|
| LEFT   | −39.6292 | −39.2362  | −41.4204  | −36.5709 | −36.4466   |
| TOP    | −80.6632 | −125.293  | −184.318  | −219.736 | −218.951   |
| RIGHT  | 119.842  | 163.926   | 225.478   | 255.946  | 255.067    |
| BOTTOM | 0.450798 | 0.602908  | 0.259749  | 0.360811 | 0.330881   |

Results for the second reservoir model using a 12×24 grid are shown in Table 5.

TABLE 5

|        | FBSA-L   | FBSA-G   | FBSA-MPFA | DNR      | Fine Scale |
|--------|----------|----------|-----------|----------|------------|
| LEFT   | −36.8917 | −36.2235 | −36.3865  | −34.5435 | −36.4466   |
| TOP    | −253.622 | −262.403 | −208.031  | −216.976 | −218.951   |
| RIGHT  | 290.274  | 298.386  | 244.095   | 251.189  | 255.067    |
| BOTTOM | 0.239119 | 0.239992 | 0.321871  | 0.330314 | 0.330881   |

As shown, the Dirichlet Neumann Representation method yields rate values closest to the reference solution. It is interesting to note for this case results of FBSA-L using global solution and FBSA-G show significant oscillations as the grid is refined.

Figure 10:
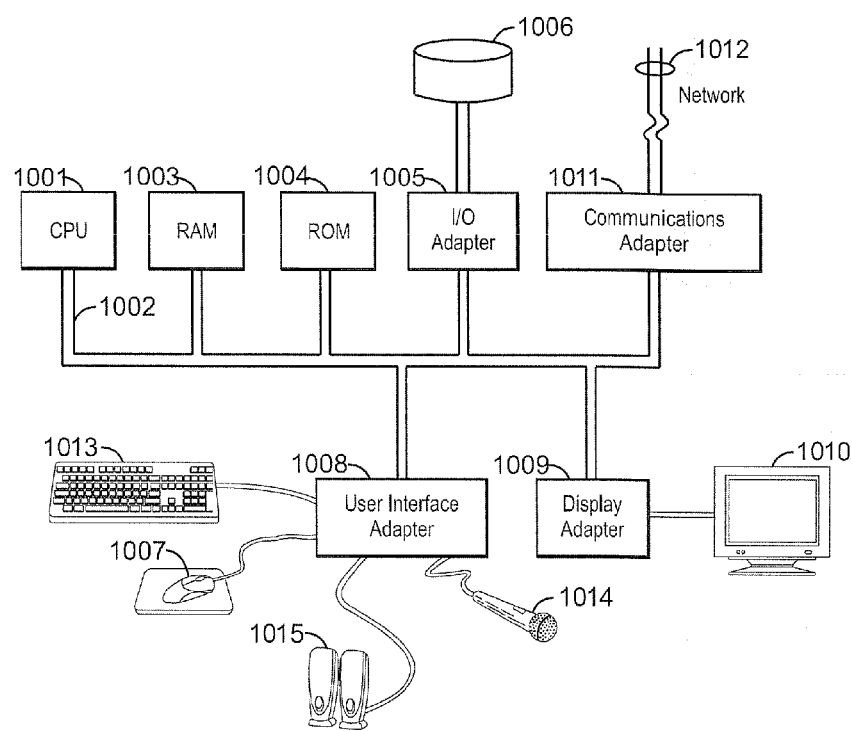
FIG. 10 is a block diagram of an exemplary computing system that may be used in exemplary embodiments of the present techniques.

The techniques discussed herein may be implemented on a computing device, such as that shown in FIG. 10. FIG. 10 shows an exemplary computer system 1000 on which software for performing processing operations of embodiments of the present techniques may be implemented. A central processing unit (CPU) 1001 is coupled to a system bus 1002. In embodiments, the CPU 1001 may be any general-purpose CPU. The present techniques are not restricted by the architecture of CPU 1001 (or other components of exemplary system 1000) as long as the CPU 1001 (and other components of system 1000) supports operations according to the techniques described herein. The CPU 1001 may execute the various logical instructions according to embodiments. For example, the CPU 1001 may execute machine-level instructions for performing processing according to the exemplary operational flow described above in conjunction with FIGS. 3 and 5. As a specific example, the CPU 1001 may execute machine-level instructions for performing the methods of FIGS. 3 and 5.

The computer system 1000 may also include random access memory (RAM) 1003, which may be SRAM, DRAM, SDRAM, or the like. The computer system 1000 may include read-only memory (ROM) 1004 which may be PROM, EPROM, EEPROM, or the like. The RAM 1003 and the ROM 1004 hold user and system data and programs, as is well known in the art. The programs may include code stored on the RAM 1004 that may be used for modeling geologic properties with homogenized mixed finite elements, in accordance with embodiments of the present techniques.

The computer system 1000 may also include an input/output (I/O) adapter 1005, a communications adapter 1011, a user interface adapter 1008, and a display adapter 1009. The I/O adapter 1005, user interface adapter 1008, and/or communications adapter 1011 may, in certain embodiments, enable a user to interact with computer system 1000 in order to input information.

The I/O adapter 1005 may connect the bus 1002 to storage device(s) 1006, such as one or more of hard drive, compact disc (CD) drive, floppy disk drive, tape drive, flash drives, USB connected storage, etc., to computer system 1000. The storage devices may be utilized when RAM 1003 is insufficient for the memory requirements associated with storing data for operations of embodiments of the present techniques. For example, the storage device 1006 of computer system 1000 may be used for storing such information as computational meshes, intermediate results and combined data sets, and/or other data used or generated in accordance with embodiments of the present techniques.

The communications adapter 1011 is adapted to couple the computer system 1000 to a network 1012, which may enable information to be input to and/or output from the system 1000 via the network 1012, for example, the Internet or other wide-area network, a local-area network, a public or private switched telephone network, a wireless network, or any combination of the foregoing. The user interface adapter 1008 couples user input devices, such as a keyboard 1013, a pointing device 1007, and a microphone 1014 and/or output devices, such as speaker(s) 1015 to computer system 1000. The display adapter 1009 is driven by the CPU 1001 to control the display on the display device 1010, for example, to display information pertaining to a target area under analysis, such as displaying a generated representation of the computational mesh, the reservoir, or the target area, according to certain embodiments.

It shall be appreciated that the present techniques are not limited to the architecture of the computer system 1000 shown in FIG. 10. For example, any suitable processor-based device may be utilized for implementing all or a portion of embodiments of the present techniques, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments.

While the present techniques may be susceptible to various modifications and alternative forms, the exemplary embodiments discussed above have been shown only by way of example. However, it should again be understood that the present techniques are not intended to be limited to the particular embodiments disclosed herein. Indeed, the present techniques include all alternatives, modifications, and equivalents falling within the true spirit and scope of the appended claims.

What is claimed is:

1. A method for modeling properties of a reservoir, comprising:
   constructing a coarse computational mesh for the reservoir in a computer system, wherein the coarse computational mesh comprises a plurality of cells;
   determining a plurality of flows for each of the plurality of cells based on Dirichlet boundary conditions, wherein determining the plurality of flows for each of the plurality of cells comprises:
      selecting a plurality of pressure points along a plurality of boundaries of the cell, wherein selecting the plurality of pressure points at the boundary comprises:
         selecting a mid-point of a boundary of the cell if a scalar permeability or all entries of a permeability tensor at the boundary is less than a first pre-determined threshold;
         selecting two points close to two ends of the boundary if a maximum permeability or a maximum entry of the permeability tensor at the boundary is greater than the first pre-determined threshold;
         selecting a first pressure point if the maximum of the scalar permeability or entries of the permeability tensor is greater than the first pre-determined threshold;
         selecting the first pressure point where the scalar permeability or an entry of the permeability tensor reaches the maximum; and
         selecting additional pressure points away from the first pressure point, wherein a spacing, h, of the additional pressure points, comprises:

$$h = \min\left\{\frac{b}{1 + c(k_m - a)^2}, \frac{d}{1 + c\delta k_m^2}\right\}$$

where $k_m$ is equal to the maximum entry of the permeability tensor, and a, b, c, and d are constant parameters;
      associating the plurality of pressure points with a corresponding plurality of segments;
      determining a plurality of solutions to a steady-state pressure equation for the cell based on the plurality of pressure points at the boundary and a first Dirichlet boundary condition;
      computing a first flow rate across each of the plurality of segments based on a steady-state pressure equation solution;
      determining a solution to an inhomogenous pressure equation for the cell based on a second Dirichlet boundary condition; and
      computing a second flow rate across each of the plurality of segments based on the solution to the inhomogenous pressure equation, wherein the plurality of flows comprise the second flow rate; and
   determining a solution to a coarse pressure equation for the reservoir based on the plurality of flows.

2. The method of claim 1, wherein the second Dirichlet boundary condition specifies that a pressure is equal to 0 at the boundary, and wherein the first Dirichlet boundary condition specifies that:
   a pressure at one of the plurality of pressure points is equal to 1;
   a pressure at a remaining portion of the plurality of pressure points is equal to 0; and
   a pressure between the plurality of pressure points is linear.

3. The method of claim 1, wherein associating the plurality of pressure points with a corresponding plurality of segments comprises identifying the plurality of segments, wherein a segment comprises a starting point and an ending point, and wherein the starting point and the ending point comprise one of:
   a mid-point between a corresponding pressure point and a neighboring pressure point; and
   a vertex of the cell.

4. The method of claim 1, wherein the plurality of pressure points represent:
   a plurality of possible pressure profiles of the reservoir; and
   a plurality of possible flow distributions of the reservoir.

5. The method of claim 1, wherein selecting the plurality of pressure points at the boundary comprises selecting a pressure point where permeability is high.

6. The method of claim 1, wherein the plurality of cells may have at least one of:
   a straight cell boundary, wherein the plurality of cells are two-dimensional;
   a curved cell boundary, wherein the plurality of cells are two-dimensional or three-dimensional; and
   a flat cell boundary, wherein the plurality of cells are three-dimensional.

7. The method of claim 1, wherein determining a plurality of solutions to a steady-state pressure equation for the cell based on the plurality of pressure points at the boundary and a first Dirichlet boundary condition comprises using one of:
   a finite difference/finite volume method; and
   a finite element method.

8. The method of claim 1, wherein determining a solution to an inhomogenous pressure equation for the cell based on a second Dirichlet boundary condition comprises using one of:
a finite difference/finite volume method; and
a finite element method.

9. The method of claim 1, wherein solving a coarse pressure equation for the reservoir based on the plurality of flows comprises solving a single-phase steady state pressure equation using local mass conservation equation for each cell and flux continuity equation for each boundary segment between cells.

10. The method of claim 1, wherein solving a coarse pressure equation for the reservoir based on the plurality of flows comprises solving volume balance equation for each cell and flow continuity equation for each boundary segment between the plurality of cells for multiphase flow.

11. The method of claim 1, comprising reconstructing a fine-scale flow based on a multiscale approach, and the solution to the coarse pressure equation.

12. The method of claim 11, wherein reconstructing the fine-scale flow comprises:
determining a plurality of fine-scale flow fields using pressure basis functions for each side of a boundary of the plurality of cells; and
averaging a plurality of fine-scale flows for the plurality of fine-scale flow fields.

13. A system for modeling properties of a reservoir, comprising:
a plurality of processors;
a machine readable medium comprising code configured to direct at least one of the plurality of processors to:
construct a coarse computational mesh for the reservoir, wherein the coarse computational mesh comprises a plurality of cells;
determine a plurality of flows for each of the plurality of cells based on Dirichlet boundary conditions, wherein the code configured to direct at least one of the plurality of processors to determine the plurality of flows for each of the plurality of cells is further configured to:
select a plurality of pressure points along a plurality of boundaries of the cell, wherein the code configured to select the plurality of pressure points at the boundary is further configured to:
select a mid-point of a boundary of the cell if a scalar permeability or all entries of a permeability tensor at the boundary is less than a first pre-determined threshold;
select two points close to two ends of the boundary if a maximum permeability or a maximum entry of the permeability tensor at the boundary is greater than the first pre-determined threshold;
select a first pressure point if the maximum of the scalar permeability or entries of the permeability tensor is greater than the first pre-determined threshold;
select the first pressure point where the scalar permeability or an entry of the permeability tensor reaches the maximum; and
select additional pressure points away from the first pressure point, wherein a spacing, h, of the additional pressure points, comprises:

$$h = \min\left\{\frac{b}{1+c(k_m-a)^2}, \frac{d}{1+c\delta k_m^2}\right\}$$

where $k_m$ is equal to the maximum entry of the permeability tensor, and a, b, c, and d are constant parameters;
associate the plurality of pressure points with a corresponding plurality of segments;
determine a plurality of solutions to a steady-state pressure equation for the cell based on the plurality of pressure points at the boundary and a first Dirichlet boundary condition;
compute a first flow rate across each of the plurality of segments based on a steady-state pressure equation solution;
determine a solution to an inhomogenous pressure equation for the cell based on a second Dirichlet boundary condition; and
compute a second flow rate across each of the plurality of segments based on the solution to the inhomogenous pressure equation, wherein the plurality of flows comprise the second flow rate;
determine a solution to a coarse pressure equation for the reservoir based on the plurality of flows; and
reconstruct a fine-scale flow based on a multiscale approach, and the solution to the coarse pressure equation.

14. The system of claim 13, wherein the code configured to direct at least one of the plurality of processors to reconstruct the fine-scale flow comprises code configured to direct at least one of the plurality of processors to:
determine a plurality of fine-scale flow fields using pressure basis functions for each side of a boundary of the plurality of cells; and
average a plurality of fine-scale flows for the plurality of fine-scale flow fields.

15. The system of claim 13, wherein the second Dirichlet boundary condition specifies that a pressure is equal to 0 at the boundary, and wherein the first Dirichlet boundary condition specifies that:
a pressure at one of the plurality of pressure points is equal to 1;
a pressure at a remaining portion of the plurality of pressure points is equal to 0; and
a pressure between the plurality of pressure points is linear.

16. A method for producing hydrocarbons from an oil and/or gas field using an upscaling method relating to a physical structure, the method for producing hydrocarbons comprising:
constructing a coarse computational mesh for the physical structure in a computer system, wherein the coarse computational mesh comprises a plurality of cells;
determining a plurality of flows for each of the plurality of cells based on Dirichlet boundary conditions, wherein determining the plurality of flows for each of the plurality of cells comprises:
selecting a plurality of pressure points along a plurality of boundaries of the cell, wherein selecting the plurality of pressure points at the boundary comprises:
selecting a mid-point of a boundary of the cell if a scalar permeability or all entries of a permeability tensor at the boundary is less than a first pre-determined threshold;
selecting two points close to two ends of the boundary if a maximum permeability or a maximum entry of the permeability tensor at the boundary is greater than the first pre-determined threshold;

selecting a first pressure point if the maximum of the scalar permeability or entries of the permeability tensor is greater than the first pre-determined threshold;

selecting the first pressure point where the scalar permeability or an entry of the permeability tensor reaches the maximum; and selecting additional pressure points away from the first pressure point, wherein a spacing, h, of the additional pressure points, comprises:

$$h = \min\left\{\frac{b}{1 + c(k_m - a)^2}, \frac{d}{1 + c\delta k_m^2}\right\}$$

where $k_m$ is equal to the maximum entry of the permeability tensor, and a, b, c, and d are constant parameters;

associating the plurality of pressure points with a corresponding plurality of segments;

determining a plurality of solutions to a steady-state pressure equation for the cell based on the plurality of pressure points at the boundary and a first Dirichlet boundary condition;

computing a first flow rate across each of the plurality of segments based on a steady-state pressure equation solution;

determining a solution to an inhomogenous pressure equation for the cell based on a second Dirichlet boundary condition; and computing a second flow rate across each of the plurality of segments based on the solution to the inhomogenous pressure equation, wherein the plurality of flows comprise the second flow rate; and determining a solution to a coarse pressure equation for the reservoir based on the plurality of flows.

* * * * *